United States Patent [19]

Ozu et al.

[11] Patent Number: 5,207,071
[45] Date of Patent: May 4, 1993

[54] CURRENT CONTROL APPARATUS FOR AIR-CONDITIONING SYSTEM

[75] Inventors: Masao Ozu; Harunobu Nukushina; Michika Uesugi; Atsuyuki Hiruma; Kazuo Mochizuki; Toru Kubo; Masao Isshiki; Oserojouin Watabiki, all of Fuji; Hiroyuki Ota, Numazu; Kazuhito Ono, Fuji, all of Japan

[73] Assignee: Kabushiki Kaisha Toshiba, Kawasaki, Japan

[21] Appl. No.: 872,972

[22] Filed: Apr. 24, 1992

[30] Foreign Application Priority Data

Apr. 26, 1991 [JP] Japan .................................. 3-96571
Jun. 28, 1991 [JP] Japan .................................. 3-158990

[51] Int. Cl.⁵ .............................................. F25B 1/00
[52] U.S. Cl. .......................................... 62/175; 62/230; 307/32
[58] Field of Search .................... 62/230, 229, 228.4, 62/175; 236/47, 51; 165/22; 307/39, 53, 55, 56, 38, 31, 32; 364/492, 493

[56] References Cited

U.S. PATENT DOCUMENTS

| | | | |
|---|---|---|---|
| 4,257,238 | 3/1981 | Kountz et al. | 62/176.6 X |
| 4,485,864 | 12/1984 | Carrell et al. | 236/47 X |
| 4,520,274 | 5/1985 | Stants | 307/39 |
| 4,656,835 | 4/1987 | Kidder et al. | 62/175 |
| 4,657,179 | 4/1987 | Aggers et al. | 236/51 |
| 4,736,595 | 4/1988 | Kato | 62/230 X |
| 5,095,715 | 3/1992 | Dudley | 62/230 X |
| 5,107,685 | 4/1992 | Kobayashi | 62/230 X |

FOREIGN PATENT DOCUMENTS

| | | |
|---|---|---|
| 59-201393 | 11/1984 | Japan . |
| 61-211657 | 9/1986 | Japan . |
| 61-211659 | 9/1986 | Japan . |
| 1328628 | 8/1973 | United Kingdom . |

Primary Examiner—Harry B. Tanner
Attorney, Agent, or Firm—Foley & Lardner

[57] ABSTRACT

There is disclosed a current control apparatus comprising first controllers adapted for detecting an overall or total load current to calculate distribution values for distributing a current margin with respect to an overall or total current limit value to respective air-conditioners; and second controllers adapted for respectively controlling air-conditioners so as not to exceed individual current limit values, and for carrying out an incremental correction of individual current limit values in accordance with distribution values calculated by the first controllers.

9 Claims, 26 Drawing Sheets

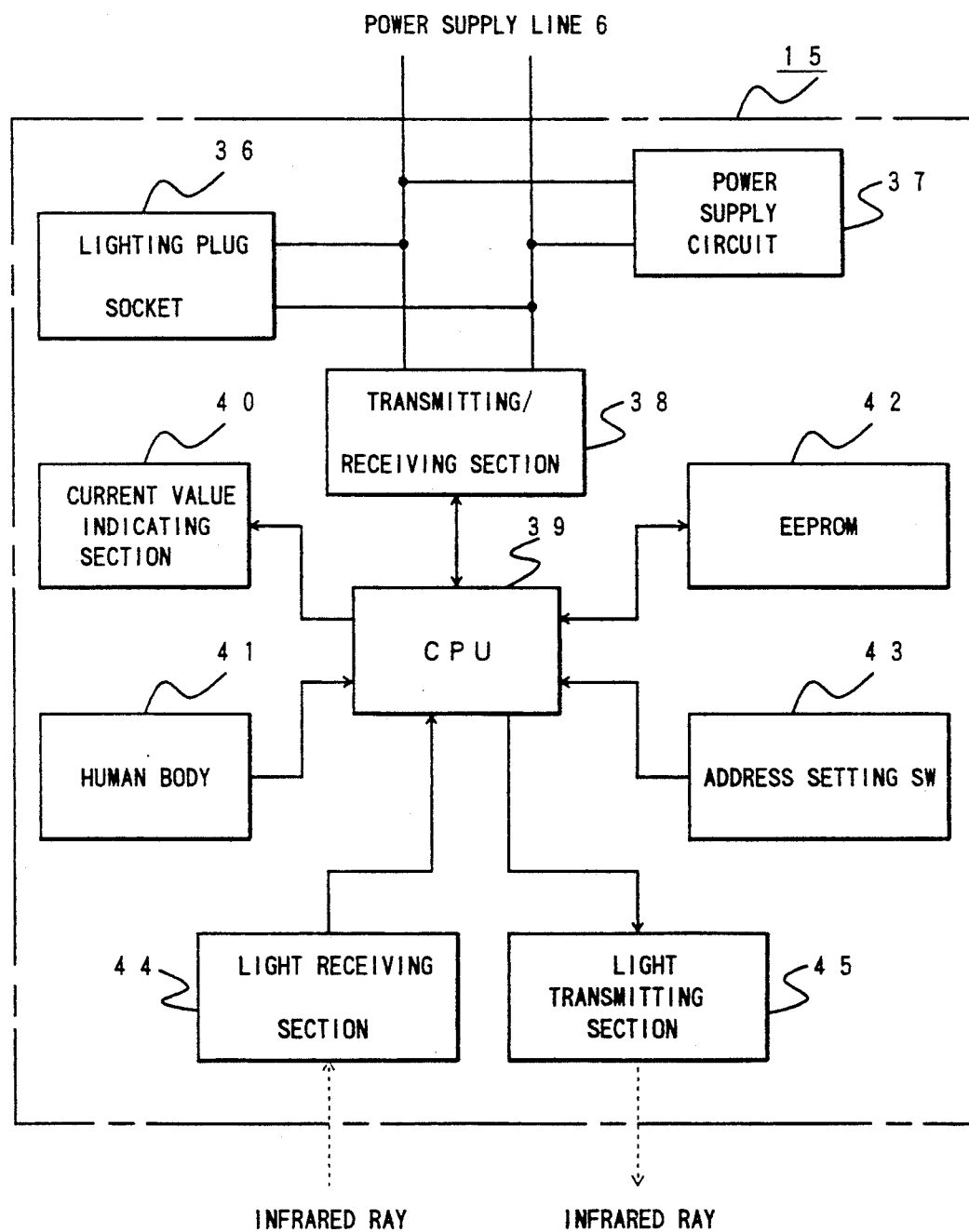
F I G. 5

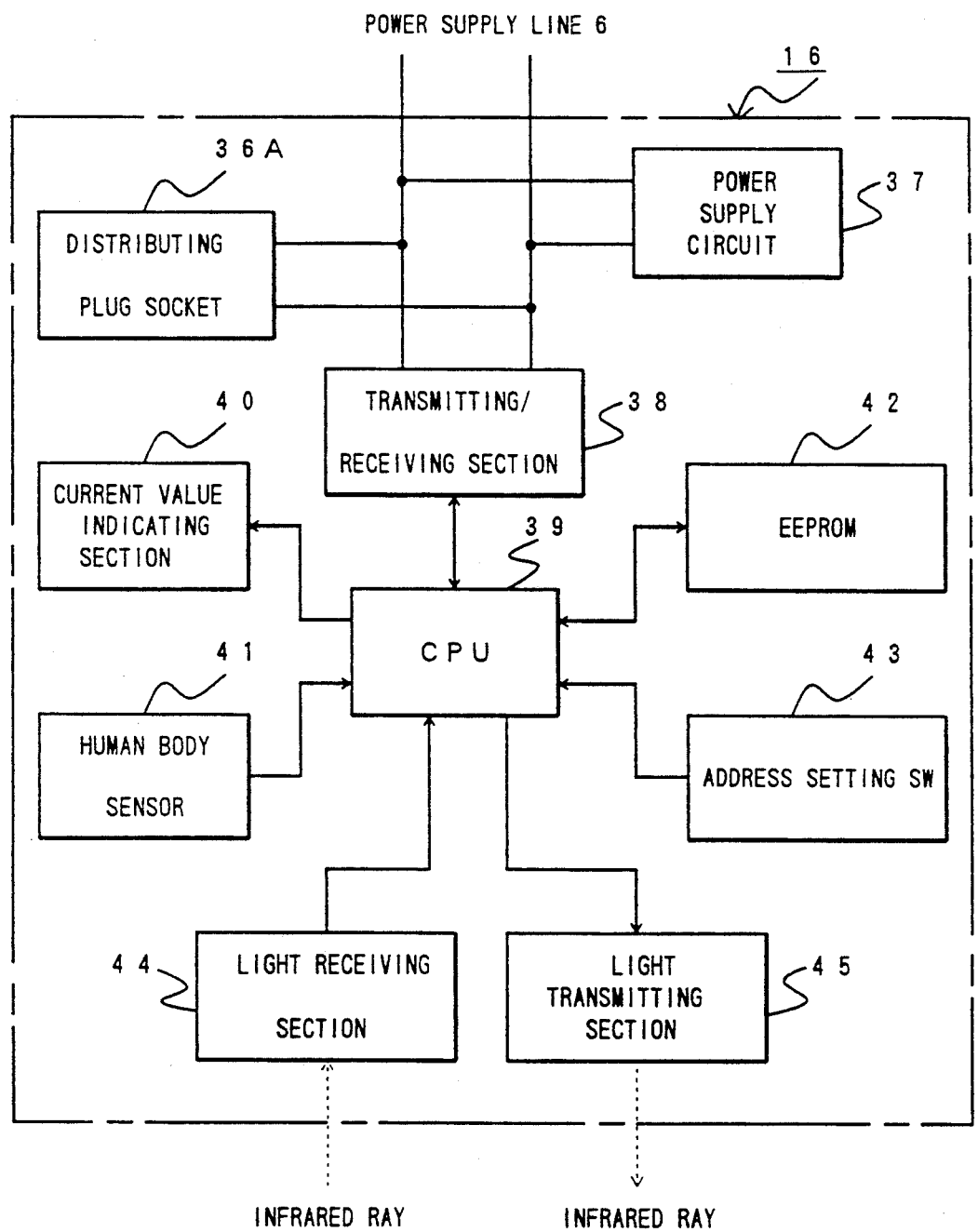
F I G. 7

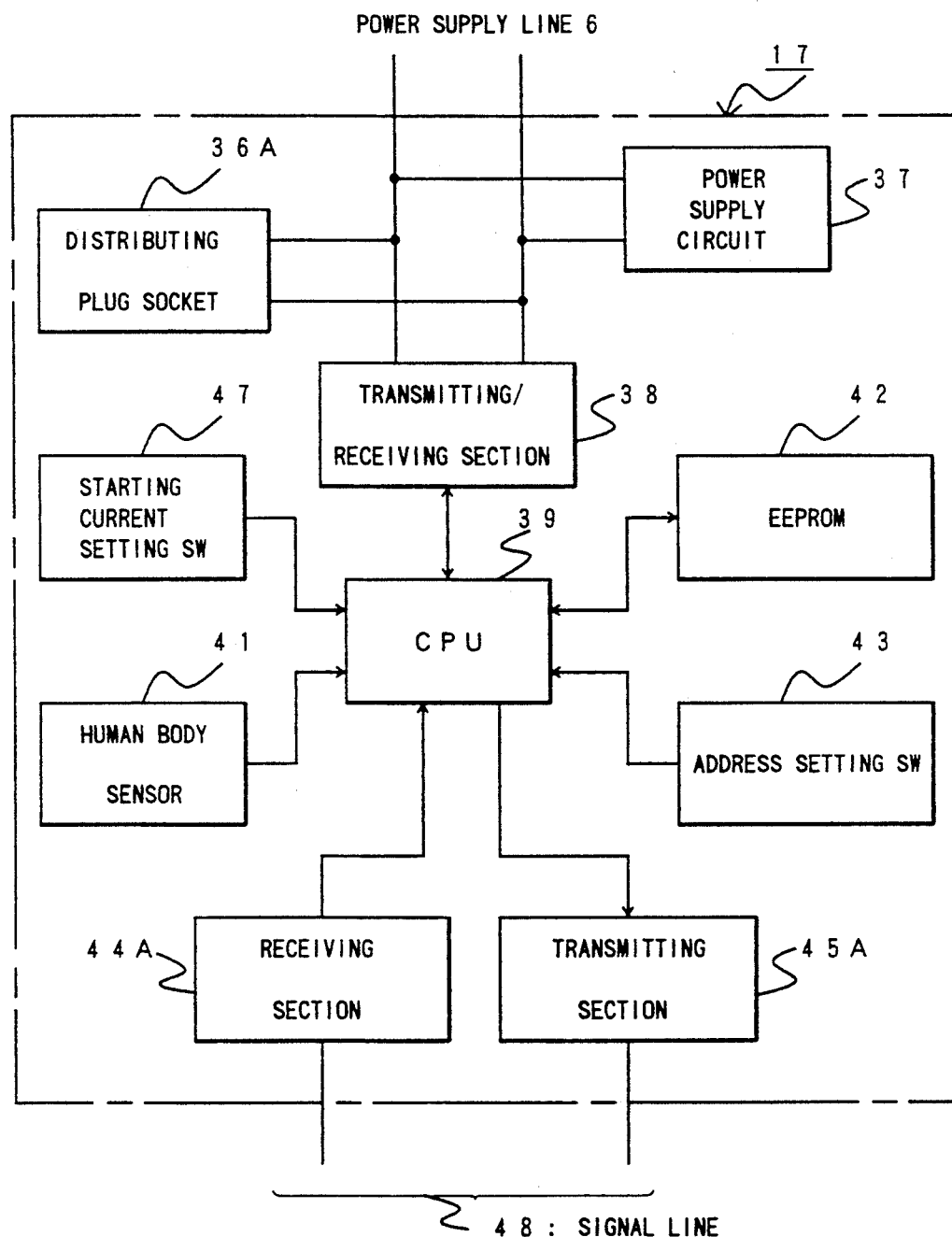
F I G. 9

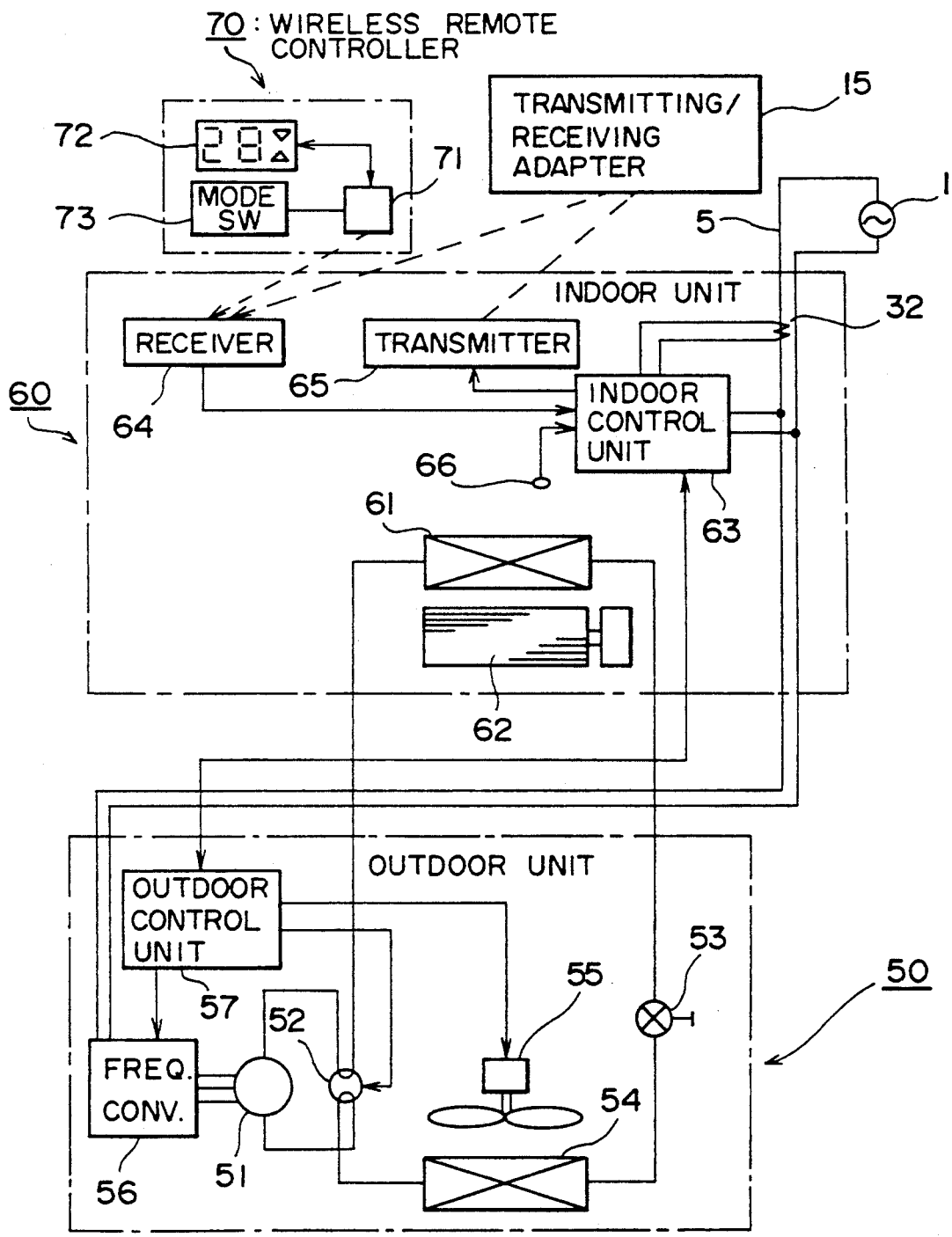
F I G. 10

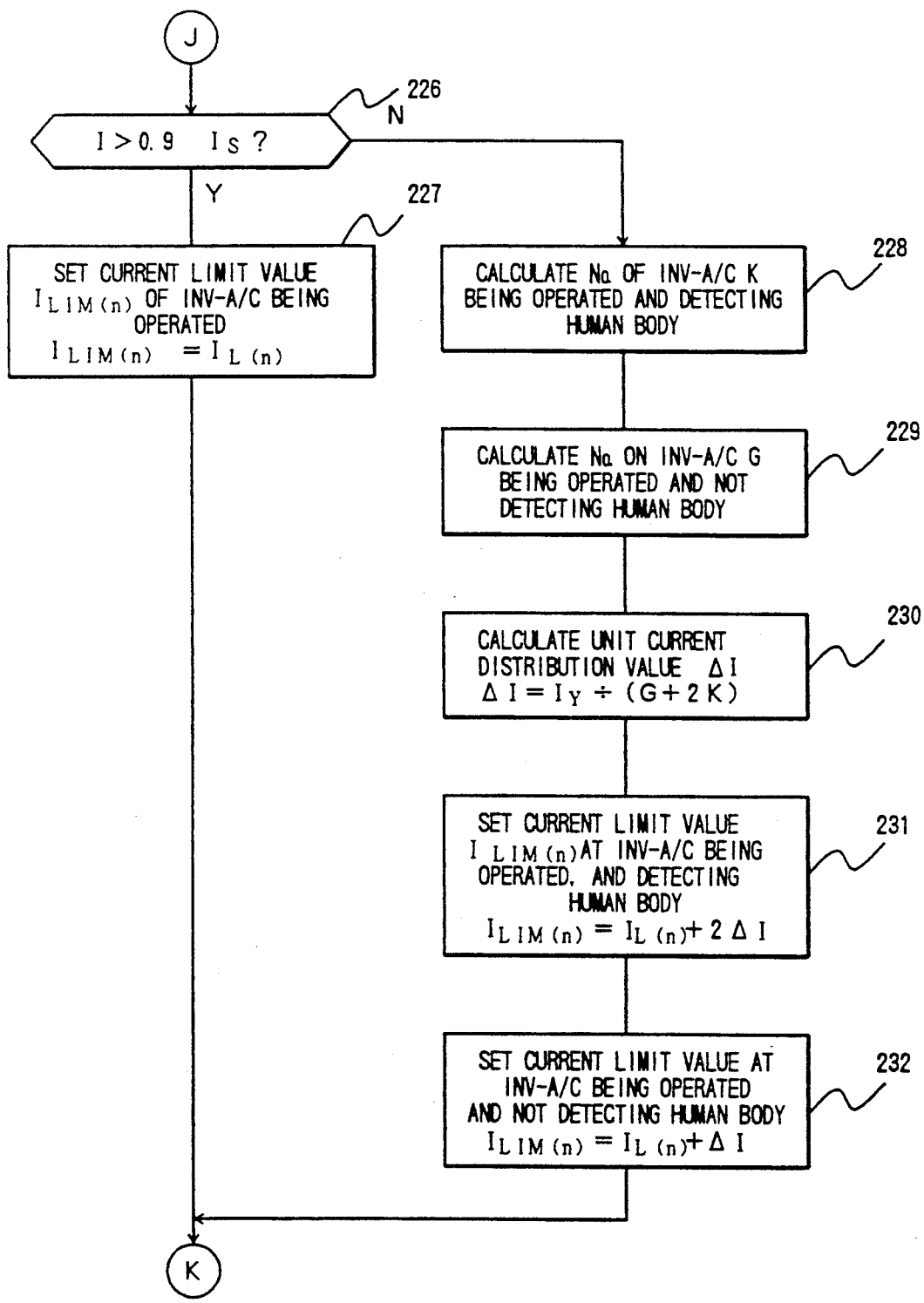
F I G. 17C

CURRENT CONTROL APPARATUS FOR AIR-CONDITIONING SYSTEM

TECHNICAL FIELD OF THE INVENTION

This invention relates to a current control apparatus for an air-conditioning system, which is adapted for suppressing an overall or total current consumption of electric loads including at least two capability or ability adjustable type air-conditioners so that it becomes equal to a value less than an overall current limit value determined in advance.

BACKGROUND OF THE INVENTION

In recent years, it has not been rare that a plurality of air-conditioners are installed in home and an electric cooking appliance or appliances of a large capacity are installed in addition thereto or in conjunction therewith. In such a case, an attempt is generally made to increase the allowed current capacity of a power supply line drawn into a house. However, in actual circumstances a measure to increase the allowed current capacity does not match up with an actual total current consumption of electric loads. Namely, there actually results circumstances where a molded-case circuit-breaker may be frequently tripped, leading to service interruption. Although a motor for driving a compressor included in an air-conditioner of these electric loads has a "large capacity load" in which the current consumption is relatively large, there are many instances where such a motor is considered as an "unimportant load" for which an emergency is not so required among home electric loads.

In an apparatus disclosed in the Japanese Laid Open Patent Application (JP-A) No. 201393/1984 publication, a technique is employed to detect a current flowing through a circuit-breaker, i.e., a total current to stop the operation of the air-conditioner so that this total current is not above a trip current value, or to successively stop one by one, when a plurality of air-conditioners are installed, these air-conditioners accordingly as the total current becomes equal to a trip current value of the circuit-breaker. However, once the air-conditioner is stopped, even if such a stop is a temporary stop, it would take much time for restarting, and even if the air-conditioner is restarted, it cannot immediately exhibit air-conditioning capability or ability. For this reason, there are problems from both viewpoints of the air-conditioning effect and energy conservation or saving.

On the other hand, in an apparatus disclosed in the Japanese Laid Open Patent Application (JP-A) No. 211659/1986 publication, a technique is employed to effect a control such that when a total current becomes equal to the trip current value of a circuit-breaker, a drive frequency of a compressor of a specific air-conditioner is lowered, and to further effect a control to detect that the total current is lowered to a predetermined value by the above control to increase the drive frequency so that it becomes in correspondence with the original frequency for a second time. Accordingly, since the compressor is not easy to be stopped, the problems of the air-conditioning effect and the energy conservation or saving are difficult to take place. However, in the case where a plurality of such air-conditioners are installed and are operated at the same time, unless current detection levels of all the air-conditioners are in correspondence with each other, the capability or ability of only an air-conditioner having the highest current detection level is lowered. As a result, that air-conditioner would be eventually stopped. In this case, similarly to the technology described in the above referenced Japanese Laid Open Application (JP-A) No. 201393/1984, the air-conditioner is once stopped. This is a problem from the viewpoints of the air-conditioning effect and the energy conservation or saving.

Further, in the case where current detection levels of all plural air-conditioners installed are assumed to be the same although this is not realistic, when a total current becomes close to a trip current of the circuit-breaker, the capabilities or abilities of all the air-conditioners being operated are caused to be lowered. As a result, the total current is lowered to a great degree as compared to the trip current of the circuit-breaker. At this time, the capabilities of respective air-conditioners are increased or enhanced. In this case, since the capabilities of a plurality of air-conditioners are increased or enhanced at the same time, the total current increases for a second time. As a result, the capabilities of all the air-conditioners being operated are caused to be lowered for a second time, resulting in a state where the above operation is repeatedly conducted. This state is an entirely unstable state. This constitutes a cause to hasten consumption of equipments and to shorten the life time.

SUMMARY OF THE INVENTION

An object of this invention is to provide a current control apparatus for an air-conditioning system which can hold down an overall or total current consumption of a load to a value less than a predetermined overall or total current limit value, which can operate air-conditioners such that the frequency with which they are stopped is minimum, and which can exhibit a maximum current capacity.

Another object of this invention is to provide a current control apparatus which can carry out control of a plurality of air-conditioners without a provision of any special control signal line in order to allow a filter for prevention of noise leakage to be small-sized.

To achieve the above-mentioned objects, in accordance with this invention, there is provided a current control apparatus for an air-conditioning system in which a plurality of large capacity electric loads including at least two air-conditioners of the capability adjustable type are connected to a power supply line, currents flowing in the air-conditioners being held down to individual current limit values, respectively, an overall or total current of a plurality of electric loads being held down to a value less than a predetermined overall or total current limit value, the current control apparatus comprising: a first controller adapted for comparing a detected value of the overall current with the overall current limit value to calculate, when the former is smaller than the latter, a distribution value for distributing, to air-conditioner being operated, a current margin taken as a difference between the detected value of the overall current and the overall current limit value; and second controllers provided every respective air-conditioners, and adapted to control a current flowing in a corresponding air-conditioner so that it is not above individual current limit value, and to carry out incremental correction of the individual current limits in accordance with a distribution value calculated by the first controller.

Further, in accordance with this invention, there is provided a current control apparatus in an air-conditioning system including at least two air-conditioners of the capability adjustable type, currents flowing in the air-conditioners being held down to values less than individual current limit values, respectively, an overall value of currents flowing in the air-conditioners being held down a predetermined overall current limit value, the current control apparatus comprising: comparison means for comparing currents flowing in the respective air-conditioners with corresponding individual current limits; first means such that when a current flowing in the air-conditioner is smaller than a corresponding individual current limit value as the result of comparison by the comparison means, the first means is operative to adjust an operating frequency of the corresponding air-conditioner in dependency upon a deviation between an actual room temperature of a corresponding room and a set temperature so as to decrease that deviation, and second means such that when a current flowing in the air-conditioner is larger than a corresponding individual current limit value as the result of comparison by the comparison means, the second means is operative to lower the operating frequency of the corresponding air-conditioner irrespective of a deviation between the actual room temperature and the set temperature.

BRIEF DESCRIPTION OF THE DRAWINGS

In the accompanying drawings:

FIG. 5 is a block diagram showing a detailed configuration of the first transmitting/receiving adapter;

FIG. 7 is a block diagram showing a detailed configuration of the second transmitting/receiving adapter;

FIG. 9 is a block diagram showing the detailed configuration of a third transmitting/receiving adapter;

FIG. 10 is a block diagram showing an inverter air-conditioner to which this invention is applied, along with its refrigerating cycle;

FIGS. 17A, 17B and 17C are flowcharts showing a current limiting procedure of the current controller;

DESCRIPTION OF THE PREFERRED EMBODIMENTS

Figure 1:
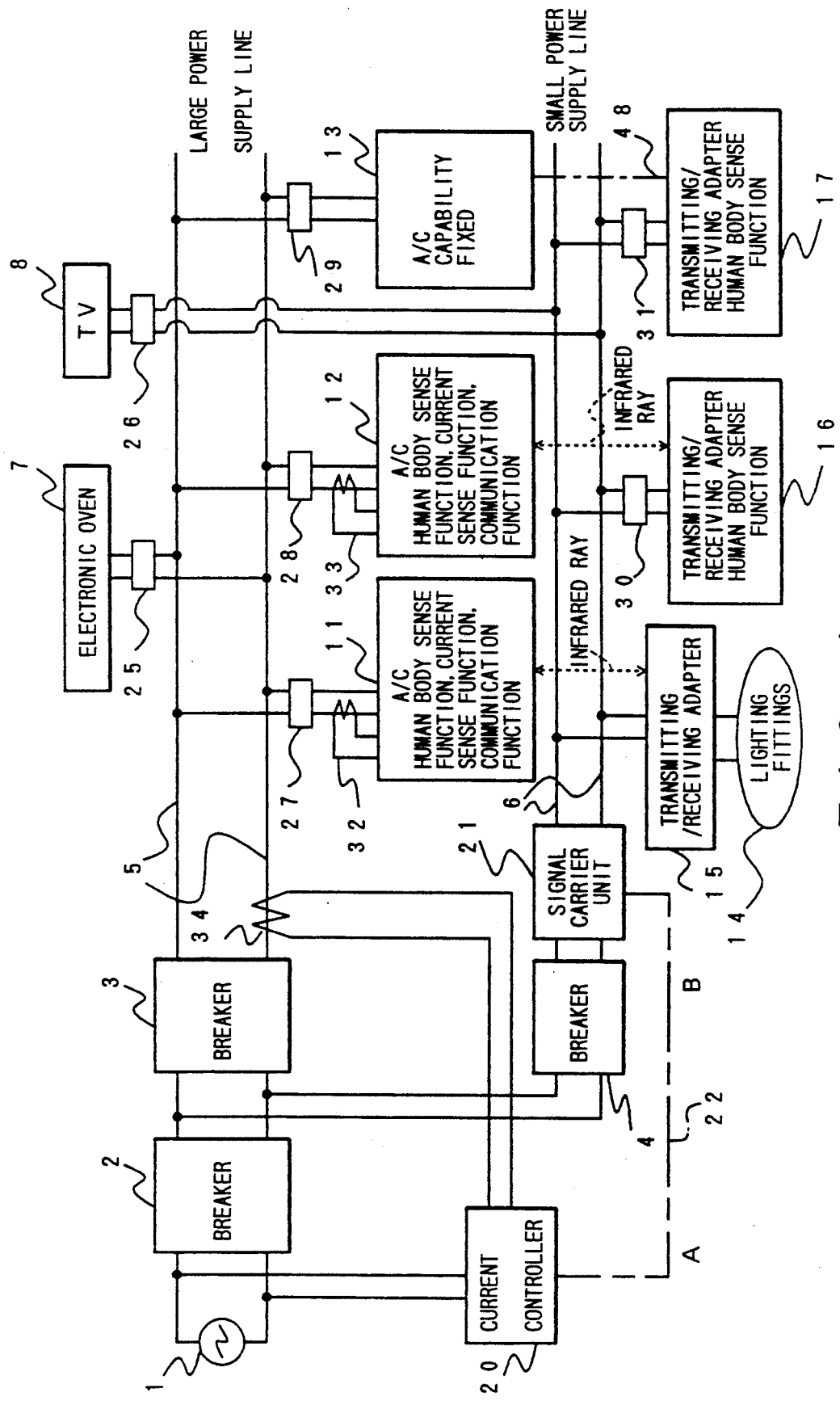
FIG. 1 is a system diagram showing an embodiment of this invention in conjunction with wirings of various electric appliances.

This invention will now be described in detail in connection with preferred embodiments shown in the drawings.

FIG. 1 is a system diagram showing an embodiment of this invention in conjunction with wirings of various electric appliances. In this figure, a circuit breaker 2 is ordinarily provided on a distribution line drawn from an a.c. power supply 1 into a house. From a load side of the breaker 2, large power supply lines 5 are branched through a first breaker 3 and small power supply lines 6 are branched through a second breaker 4.

To the large power supply lines 5, large power loads such as an electronic oven 7, capability adjustable (speed adjustable) type air-conditioners (hereinafter referred to as "inverter air-conditioners") 11 and 12, and a capability fixed type air-conditioner (hereinafter referred to as an "ordinary air-conditioner") 13, etc. are connected. Further, to the small power supply lines 6, small power loads such as a television receiver 8 and lighting fittings 14, etc. are connected.

Among these loads, the electronic oven 7 and the television receiver 8 are connected to plug sockets or receptacles 25 and 26 are connected to respective power supply lines. Similarly, the inverter air-conditioners 11 and 12 and the ordinary air-conditioner 13 are connected to large power supply lines 5 through plug sockets or receptacles 27, 28 and 29, respectively.

The inverter air-conditioner 11 comprises human body sense means for sensing or detecting a human body existing in a room, current sense means for sensing or detecting a current consumption of the air-conditioner 11 though a current transformer (hereinafter referred to as a "CT") 32, and communication means for carrying out transmission and reception of control information by using infrared rays. Similarly, the inverter air-conditioner 12 comprises a human body sense means for sensing or detecting a human body existing in a room, current sense means for sensing or detecting a current consumption of the air-conditioner 12 through a CT33, and communication means for carrying out transmission and reception of control information by using infrared rays. Further, the ordinary air-conditioner 13 has communication means for carrying out transmission and reception of control information through corresponding signal lines.

In addition, in order to respectively carry out transmission and reception of control information between these air-conditioners, transmitting/receiving adapters 15, 16 and 17 are provided. The transmitting/receiving adapter 15 is provided between the small power supply lines 6 and the lighting fittings 14, and comprises communication means for carrying out transmission and reception between the transmitting/receiving adapter 15 and the inverter air-conditioner 11 by using infrared rays, carrier communication means for carrying out carrier communication by using the small power supply lines 6, and current indication means, etc. The transmitting/receiving adapter 16 is connected to the small power supply lines 6 by inserting a plug into the plug socket 30. The transmitting/receiving adapter 16 itself has a communication function to carry out transmission and reception between the adapter 16 and a control unit of the inverter air-conditioner 12 by using infrared rays, a communication function to carry out carrier communication by using the small power supply lines 6, and a current indicating function, etc. Further, the transmitting/receiving adapter 17 is connected to the small power supply lines 6 by inserting the plug into a plug socket 31, and has a communication function to carry out transmission and reception between the adapter 17 and a control unit of the ordinary air-conditioner 13 through a signal line 48, a communication function to carry out carrier communication by using the small power supply lines 6, and a current indicating function, etc.

On the other hand, there are provided a current controller 20 adapted to receive an operating power from the power supply side of the breaker 2 to take thereinto information of a current I from a CT34 provided on the load side of the breaker 3 to calculate a current margin $\Delta I (= I_s - I)$ with respect to an overall or total current limit value $I_s$ of the power supply lines, thus making it possible to calculate a distribution value for distributing this margin to the inverter air-conditioners 11 and 12, or to output a stop command to respective air-conditioners, and a signal carrier unit 21 adapted to carry out transmission and reception of control information between the signal carrier unit 21 and the current controller 20 through a signal line 22 to carry out carrier communication of these control information by using the small power supply lines 6.

It is to be noted that, in the embodiment, the current controller 20 and the signal carrier unit 21 correspond to an equipment called a master equipment in this invention, and the control units of the individual air-conditioners and the transmitting/receiving adapter 15 correspond to an equipment called a slave equipment in this invention.

Figure 2:
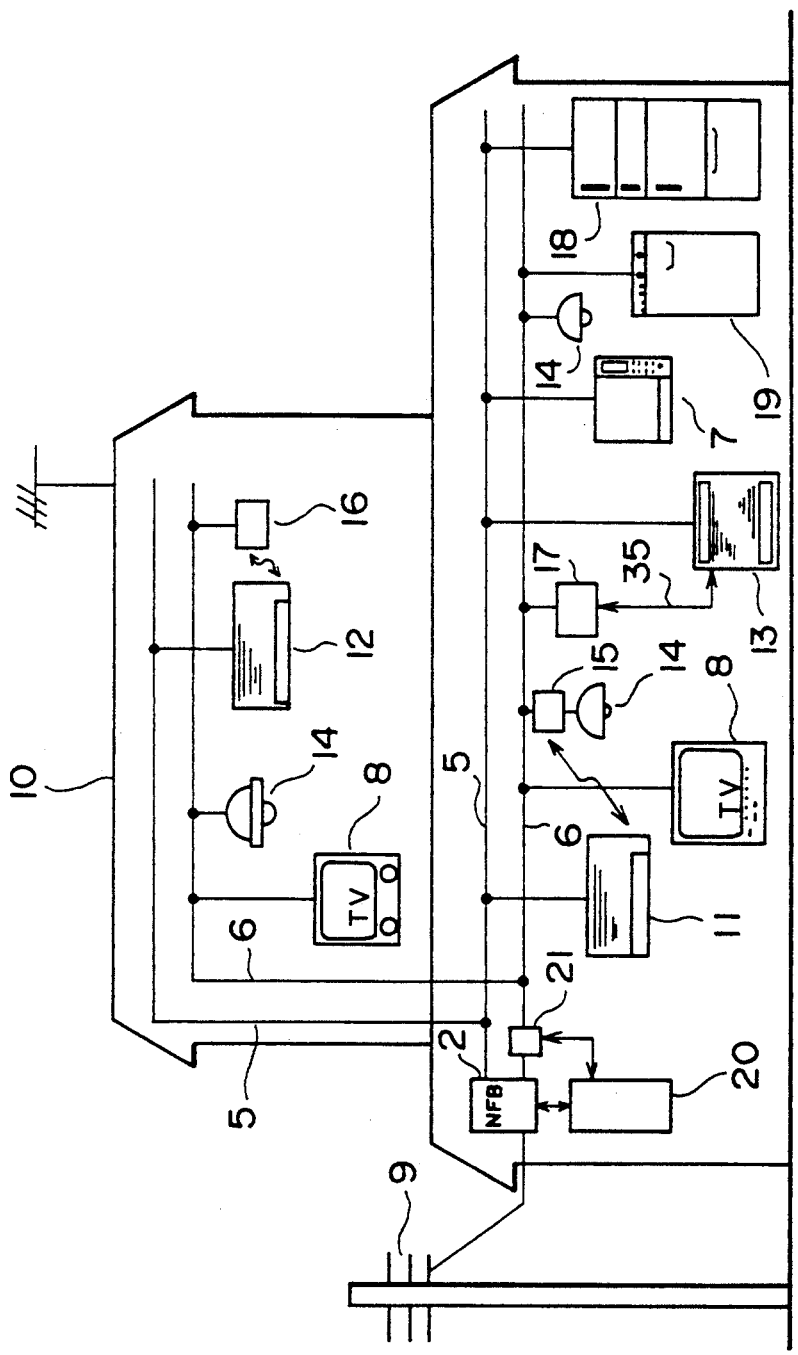
FIG. 2 is an actual state wiring diagram of the embodiment according to this invention.

FIG. 2 is an actual state wiring diagram of the above-described electric system. At the service entrance of the power supply line drawn from distribution lines 9 laid outside the house into house 10, breaker 2 is provided. In the vicinity of the breaker 2, current controller 20 and signal carrier unit 21 are provided. From the load side of the breaker 2, large power supply line 5 and small power supply line 6 are branched. Respective power supply lines are distributed to both the first floor and the second floor of the house 10. Among these power supply lines, electronic oven 7, inverter air-conditioner 11, ordinary air-conditioner 13, and an electric refrigerator 18, etc. are connected to the large power supply line 5 of the first floor. Further, lighting fittings 14, a washing machine 19, and transmitting/receiving adapter 17, etc. are connected to the small power supply line 6 of the first floor. On the other hand, an inverter air-conditioner 12 is connected to the large power supply line 5 of the second floor, and television receiver 8, lighting fitting 14 and transmitting/receiving adapter 16, etc. are connected to the small power supply line 6 of the second floor.

It is to be noted that the inverter air-conditioner 11 of the first floor can carry out transmission and reception by using infrared rays between the inverter air-conditioner 11 and the transmitting/receiving adapter 15 provided between the lighting fitting 14 and the small power supply line. The ordinary air-conditioner 13 separately provided on the first floor can carry out transmission and reception through communication line 48 between the ordinary air-conditioner 13 and the transmitting/receiving adapter 17. Further, the inverter air-conditioner 12 of the second floor carries out transmission and reception by using infrared rays between the inverter air-conditioner 12 and the transmitting/receiving adapter 16.

Figure 3:
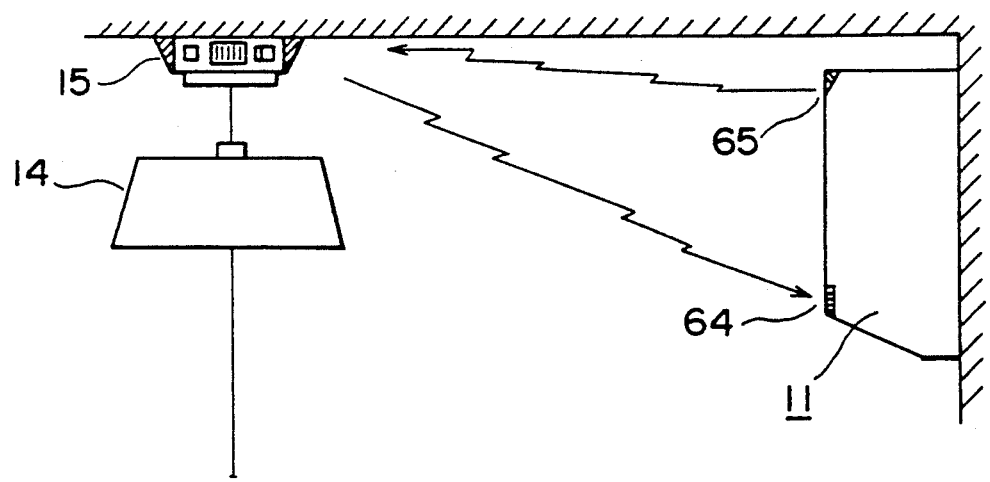
FIG. 3 is a view showing the state where a first transmitting/receiving adapter is installed.

FIG. 3 shows an arrangement state of the above-described inverter air-conditioner 11, the transmitting/receiving adapter 15, and the lighting fitting 14. On the ceiling of a room, transmitting/receiving adapter 15 is attached or affixed. The lighting fitting 14 is adapted to be inserted into the transmitting/receiving adapter 15. Thus, it is possible to carry out communication by using infrared rays between the transmitting/receiving adapter 15 and the inverter air-conditioner 11 provided at the upper part of the wall. The inverter air-conditioner 11 includes a transmitter 65 at the upper portion on the front side thereof and a receiver 64 at the lower portion on the front side thereof.

Figure 4A:
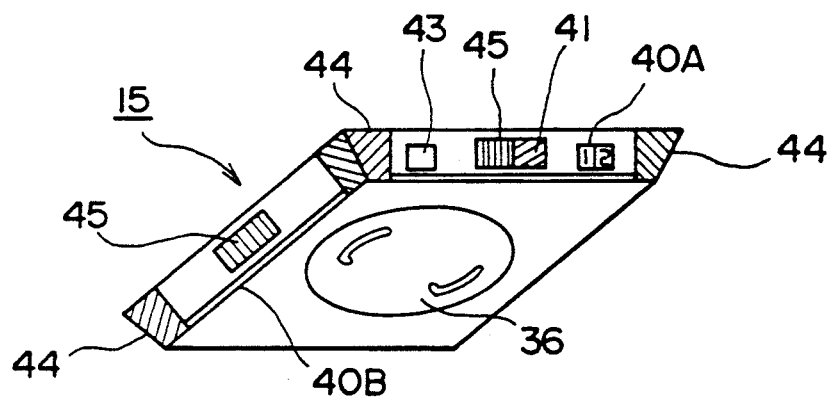
FIGS. 4A and 4B are perspective views of the first transmitting/receiving adapter.
Figure 4B:
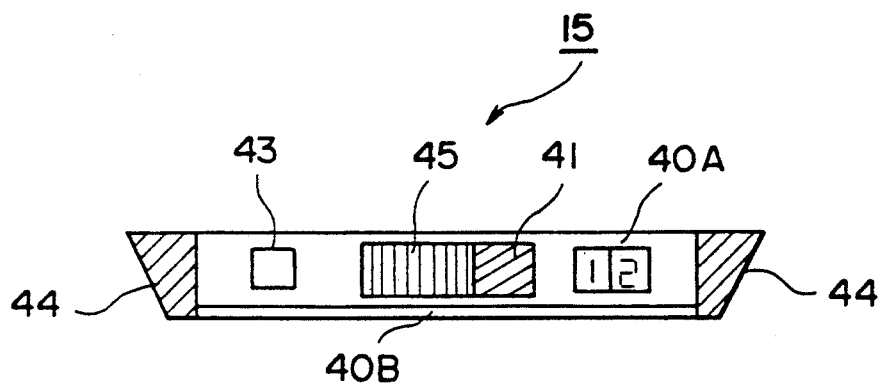

FIGS. 4A and 4B are a perspective view and a side view showing the appearance of the transmitting/receiving adapter 15, respectively. The transmitting/receiving adapter 15 is in a form such that it is flat in upper and lower directions, and that it is regularly square in plane. The adapter 15 is provided at its lower surface with a lighting plug socket 36, and is further provided at one side surface with a limit current value indication section 40A, a human body sensor 41, and an address setting switch 43. The adapter 15 is provided at respective four corner portions with light receiving sections 44, and is provided at the central portions of respective side surfaces with light transmitting sections 45. In addition, the adapter 15 is provided at respective lower end portions of the four side surfaces with current limit indication sections 40B. Here, the human body sensor 41 is provided at a portion easy to sense or detect a human being present in a room, and a light transmitting section 45 is provided on the surface opposite to the previously described inverter air-conditioner 11. It is to be noted that the human body sensor itself is known, and is described in, e.g., the Japanese Laid Open Patent Application (JP-A) No. 297587/1989 publication.

The detail of the transmitting/receiving adapter 15 is shown in FIG. 5. In this figure, lighting plug socket 36, a power supply circuit 37 for providing an internal operating power of the transmitting/receiving adapter 15, and a transmitting and receiving section 38 for carrying out carrier communication are directly connected to the power supply lines 6. Among these respective components, a microprocessor unit 39 (hereinafter referred to as a "CPU") is connected to the transmitting and receiving section 38, and the previously described current value indication section (section in which the limit current value indication section 40A and the current limit indication section 40B are combined) 40, human body sensor 41, address setting switch 43, light receiving section and light transmitting section 45, and Electrically Erasable & Programmable ROM (EEPROM) 42 are connected to the CPU 39.

Figure 6A:
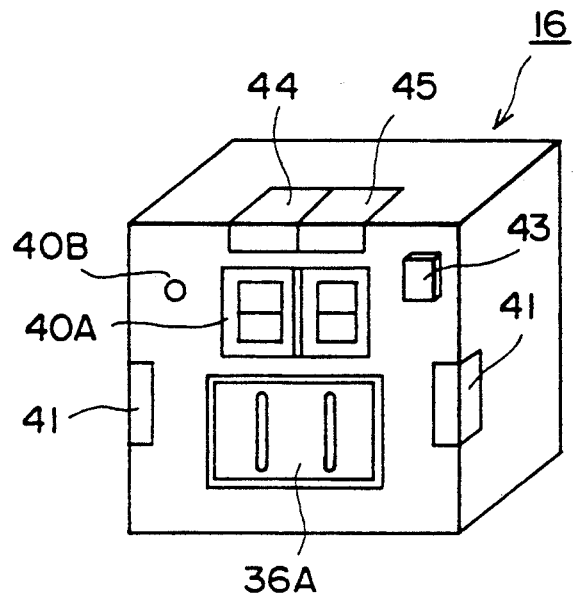
FIGS. 6A and 6B are perspective views of a second transmitting/receiving adapter.
Figure 6B:
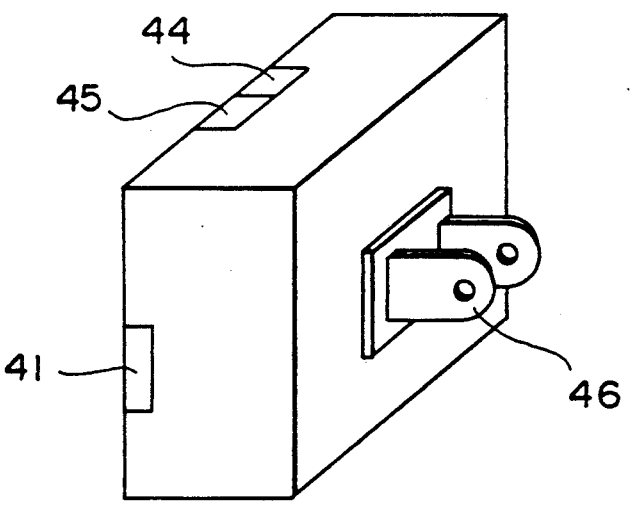

FIGS. 6A and 6B are perspective views showing the appearance of the transmitting/receiving adapter 16, respectively. In these figures, elements or components to which the same reference numerals as those of FIGS. 4A and 4B are attached denote the same elements or components, respectively. As the outside shape, the transmitting/receiving adapter 16 is formed as a rectangular parallelepiped. This adapter 16 is provided at the front surface thereof with a distribution plug socket 36A, and is provided at the back surface thereof with an attachment plug 46. Even if the attachment plug 46 is inserted into the plug socket of the wall portion, another electric appliance can be further connected to the distribution plug socket 36A of the transmitting/receiving adapter 16. Further, a limit current value indication section 40A, an overcurrent indication section 40B, and address setting switch 43 are provided on the front surface of the adapter 16. In addition, light receiving section 44 and light transmitting section 45 are provided at the corners in an upper direction, and human body 41 is provided at the corner in a lateral direction.

The detail of the transmitting/receiving adapter 16 is shown in FIG. 7. While the transmitting/receiving adapter 15 shown in FIG. 5 is provided with lighting plug socket 36 for connecting lighting fittings 14, this transmitting/receiving adapter 16 is provided with a distribution plug socket 36A in place of the lighting plug socket. Various electric appliances can be connected to the distribution plug socket 36A.

Figure 8A:
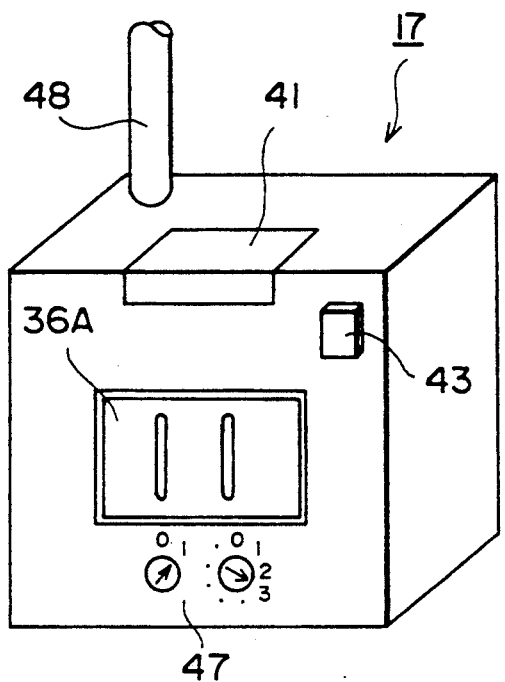
FIGS. 8A and 8B are perspective views of a third transmitting/receiving adapter.
Figure 8B:
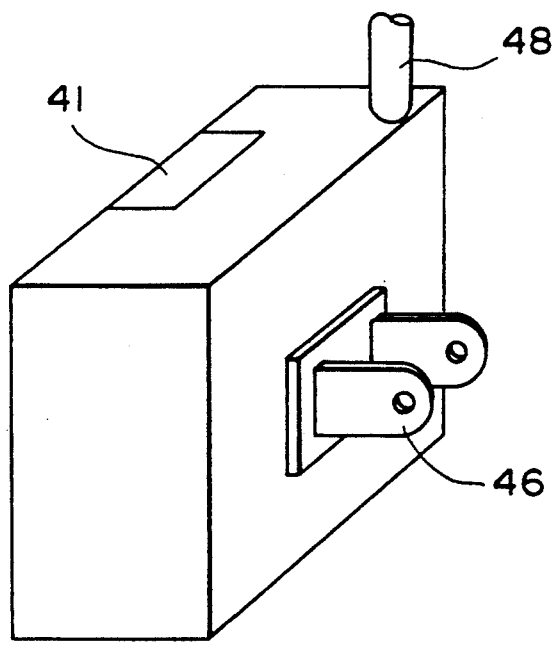

FIGS. 8A and 8B are perspective views showing the appearance of the transmitting/receiving adapter 17. In these figures, elements or components to which the same reference numerals as those of FIG. 6 are attached denote the same elements or components, respectively. This transmitting/receiving adapter 17 is provided in correspondence with the ordinary air-conditioner 13. In this transmitting/receiving adapter 17, limit current value indication section 40A, overcurrent indication section 40B, light receiving section 41, and light transmitting section 45 are eliminated from the transmitting/receiving adapter 16, and a starting current setting switch 47 for setting a starting current of the ordinary air-conditioner 13 is instead provided. In addition, a signal line 48 for carrying out communication with the ordinary air-conditioner 13 is drawn out.

FIG. 9 is a block diagram showing the detail of the transmitting/receiving adapter 17. In this transmitting/receiving adapter 17, a current setting switch 47 is connected to the CPU 39 in place of the previously described current indication section 40, and a receiving section 44A and a transmitting section 45A are connected to the CPU 39 in place of the light receiving section 44 and the light transmitting section 45.

FIG. 10 is a block diagram showing the configuration of the inverter air-conditioner 11 in conjunction with the refrigerating cycle. The inverter air-conditioner 11 is of the split type, and is comprised of an outdoor unit 50 and an indoor unit 60. The outdoor unit 50 includes an electrically activated compressor 51, a four-way valve 52, an expansion valve 53, an outdoor heat exchanger 54, and an outdoor fan 55. On the other hand, the indoor unit 60 includes an indoor heat exchanger 61 and an indoor fan 62. A well known refrigerating cycle is formed by the compressor 51, the four-way valve 52, the outdoor heat exchanger 54, the expansion valve 53, and the indoor heat exchanger 61. By switching a refrigerant path by the four-way valve 52, at the time of a heating operation, a refrigerant ejected from the compressor 51 circulates by a loop passing through the four-way valve 52, the indoor heat exchanger 61, the expansion valve 53, the outdoor heat exchanger 54, and the four-way valve 52 and returning to the compressor 51. Further, at the time of a cooling operation, refrigerant ejected from the compressor 51 circulates by a loop passing through the four-way valve 52, the outdoor heat exchanger 54, the expansion valve 53, the indoor heat exchanger 61, and the four-way valve 52 and returning to the compressor 51. Here, the outdoor fan 55 promotes heat exchange of the outdoor heat exchanger 54, and the indoor fan 62 promotes heat exchange of the indoor heat exchanger 61. Further, in the outdoor unit 50, there are provided a frequency converter 56 for controlling the frequency of a drive motor of the compressor 51, and an outdoor control unit 57 adapted for giving a frequency command to the frequency converter 56, switching the four-way valve 52, or carrying out ON/OFF control of the outdoor fan 55. The frequency converter 56 is ordinarily comprised of a rectifier and an inverter, but may be constituted with a cycloconverter depending upon circumstances.

On the other hand, in the indoor unit 60, there are provided an indoor control unit 63 constituted with a CPU as the main component, a CT 32 for detecting a current flowing in the compressor drive motor through the frequency converter 56, a receiver 64 adapted to receive a light signal from the transmitting/receiving adapter 15 and a wireless remote controller 70 to apply it to the indoor control unit 63, a transmitter 65 for transmitting a current signal from the indoor control unit 63 to the transmitting/receiving adapter 15, and a temperature sensor 66 for sensing or detecting a room temperature $T_a$. It is to be noted that the wireless remote controller 70 is provided with an infrared transmitting section 71, a temperature setter 72, and an operation mode select switch 73, etc.

The operation of the apparatus shown in FIGS. 1 to 10 thus constructed will now be described.

This apparatus has an "address registration function" to register addresses of the inverter air-conditioners 11 and 12, and the ordinary air-conditioner 13, a "data collection function" to collect data such as current values that the transmitting/receiving adapters 15 and 16 detect by using the CT32 or operating times of the respective air-conditioners, etc., a "data transfer function" to transfer data from the transmitting/receiving adapters 15, 16 and 17 to the current controller 20, and a "current limiting function" to limit currents of the transmitting/receiving adapters and the air-conditioners in accordance with a current control command or an air-conditioner stop command, etc. generated by the current controller 20 on the basis of transferred data.

These functions will now be described in accordance with the flowcharts showing a processing procedure by CPU, respectively.

(a) Address registration function

Figure 11:
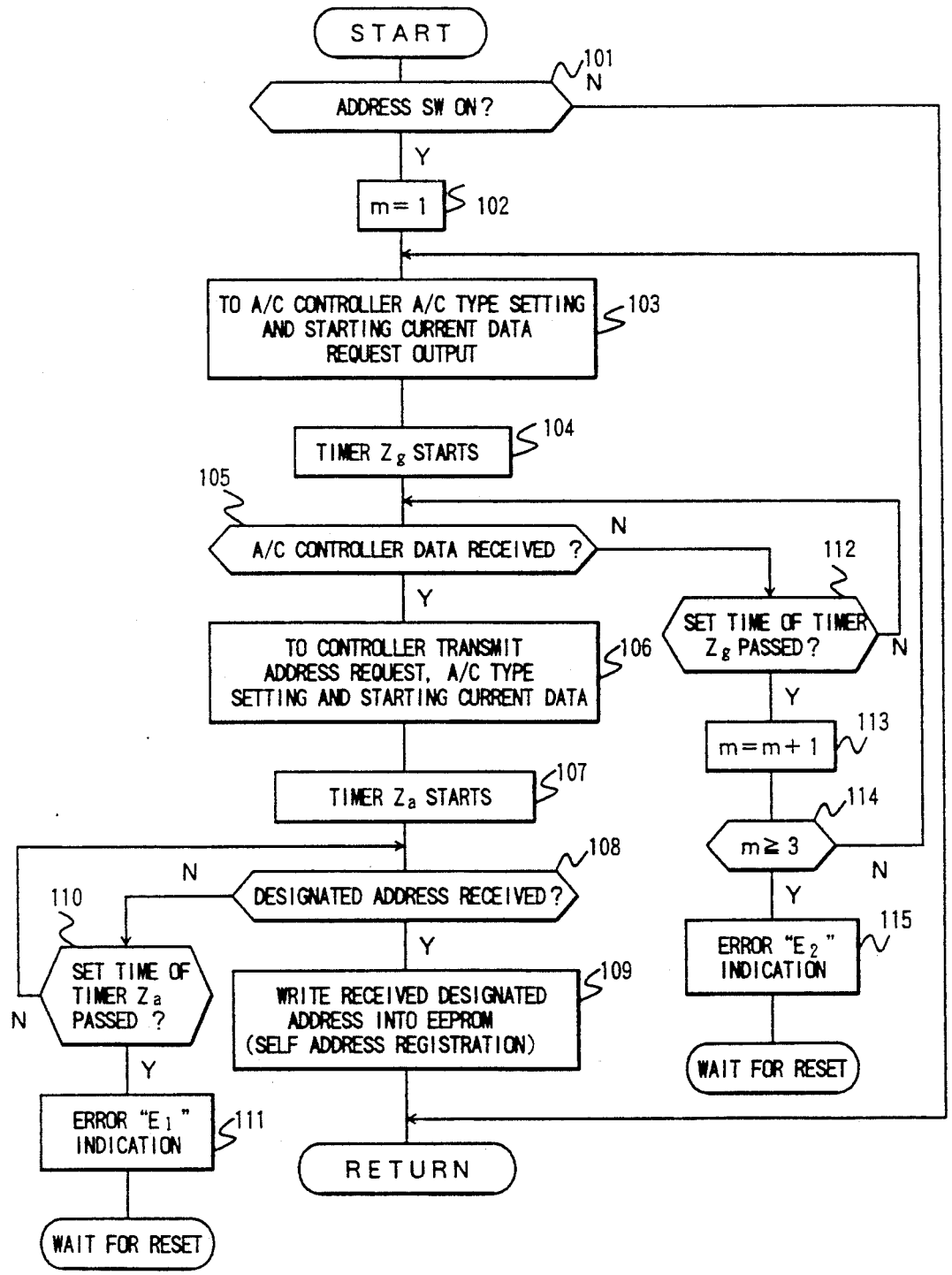
FIG. 11 is a flowchart showing an address registration procedure of the first transmitting/receiving adapter.

FIG. 11 shows a procedure of the address registration processing carried out in the transmitting/receiving adapter 15. When an address setting switch 43 is turned ON, "1" is set as the content (count value) m at the internal counter (steps 101, 102). Subsequently, "machine (air conditioner which will be abbreviated as A/C) type setting and starting current data" is requested for the inverter air-conditioner 11 to start a timer $Z_g$ (steps 103, 104). At the stage where data is received from the inverter air-conditioner 11, an "address request" and the "A/C type setting and starting current data" are transmitted to the current controller 21 to start a timer $Z_a$ (steps 105 to 107).

For these requests, the current controller 20 designates the address of the inverter air-conditioner 11 to send it back. In the transmitting/receiving adapter 15, when it receives this designated address before a set time of the timer $Z_a$ has passed, the adapter 15 writes that designated address as a self address into the EEPROM 42 (steps 108, 109). Thus, registration of the self-address is completed.

In the event that the transmitting/receiving adapter 15 does not receive a designated address by the time the set time of the timer $Z_a$ has passed, an error indication "E1" indicating that the adapter 15 failed to receive a designated address is carried out on the limit current value indication section 40A (steps 110, 111).

On the other hand, in the case where the adapter 15 failed to receive data from the inverter air-conditioner 11 even if that set time of the timer $Z_g$ has passed, data request is repeatedly made in the same manner as described above. Every time such a request is made, the content of the counter is incremented by "1". When the content m of the counter becomes equal to 3, an error indication "E2" to the effect that the adapter 15 cannot receive data is made on the limit current value indication section 40A (steps 112 to 115). Namely, in the case where data cannot be received even if data request is repeatedly made three times, an error indication is made.

It is to be noted that since the transmitting/receiving adapter 16 operates in the same manner as in the case of the transmitting/receiving adapter 15, its explanation is omitted. On the other hand, since the transmitting-/receiving adapter 17 has no indication section, it does not carry out an error indication.

Figure 12:
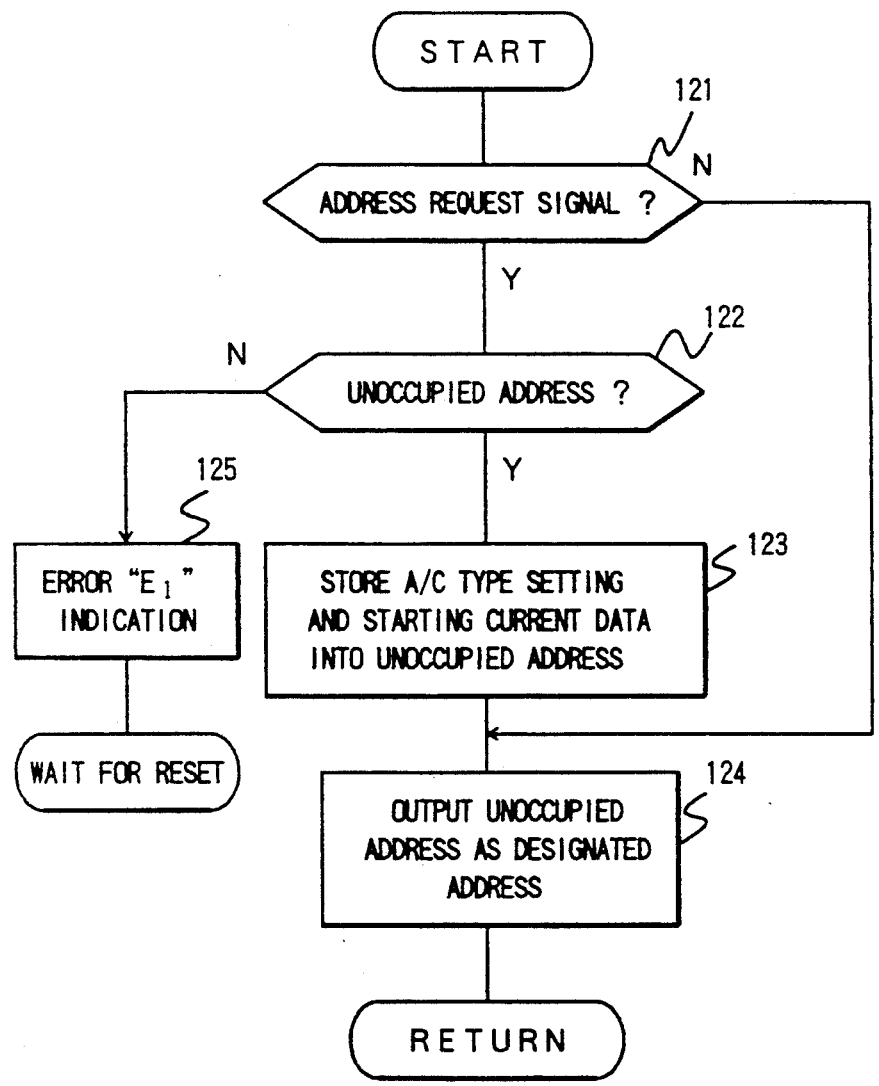
FIG. 12 is a flowchart showing an address registration procedure of a current controller.

FIG. 12 shows an address registration processing procedure by the current controller 20 carried out in accordance with an address request from the transmitting/receiving adapter 15. Responding to an address request, whether or not there is an unoccupied or empty address is judged. As a result, if there is an unoccupied address, the "A/C type setting and starting current data" is stored into that address (steps 121 to 123). Subsequently, this unoccupied address is outputted as a designated address (step 124). If there was no unoccupied address, an error indication "E1" is carried out (step 125). The address request and the address designation are carried out by the power line carrier communication using the small power supply lines 6 by way of the signal carrier unit 21 and the transmitting/receiving section 38.

(b) Data collection function

Figure 13:
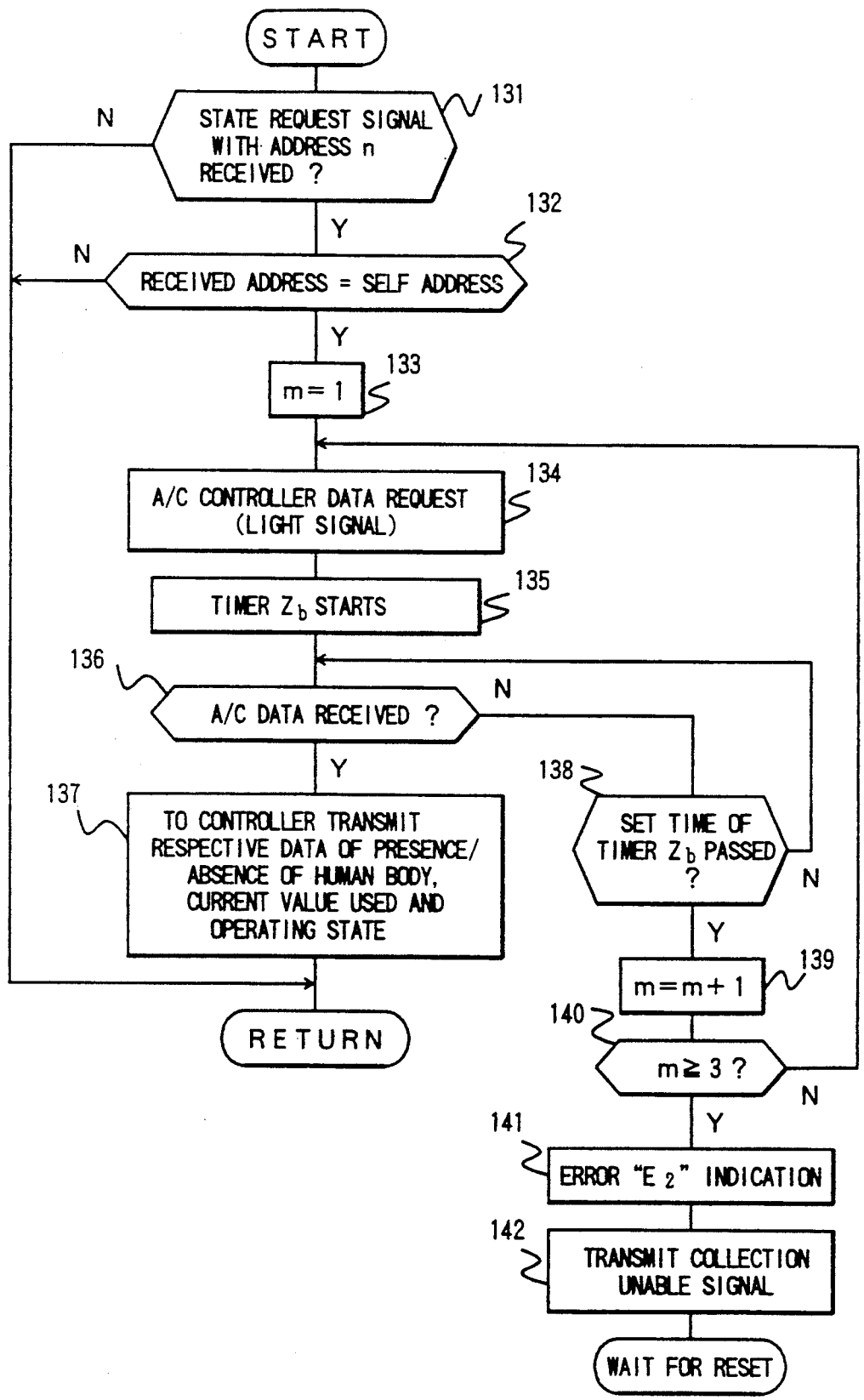
FIG. 13 is a flowchart showing a data collection procedure of the first transmitting/receiving adapter.

FIG. 13 shows a data collection processing of the transmitting/receiving adapter 15 carried out in accordance with a request for control data from the current controller 20. When the transmitting/receiving adapter 15 receives a state request signal in which an address n is added, it judges whether or not this address n is in correspondence with the self address (steps 131, 132). As a result, when the address n is judged to be in correspondence with the self address, the content m of the counter for counting the number of data collection times is set to "1" (step 133). Subsequently, a data output request is made for the inverter air-conditioner 11 to start timer $Z_b$ (steps 134, 135). In the case where data is received from the inverter air-conditioner 11 as the result of the data request, data indicating whether or not there is a human body by the human body sensor 41 and operating state data such as current consumption data, etc. are sent to the current controller 20 (steps 136, 137).

On the other hand, in the case where although a data request is made for the inverter air-conditioner 11, a set time of the timer $Z_b$ has passed in the state where data cannot be received, data request is repeatedly carried out. When the number of repetitive operations reaches 3 (three), it is judged that data collection could not be carried out. Thus, an error indication "E2" is made, and a signal indicating that data collection is unable to be carried out is transmitted to the current controller 20 (steps 138 to 142).

Figure 14:
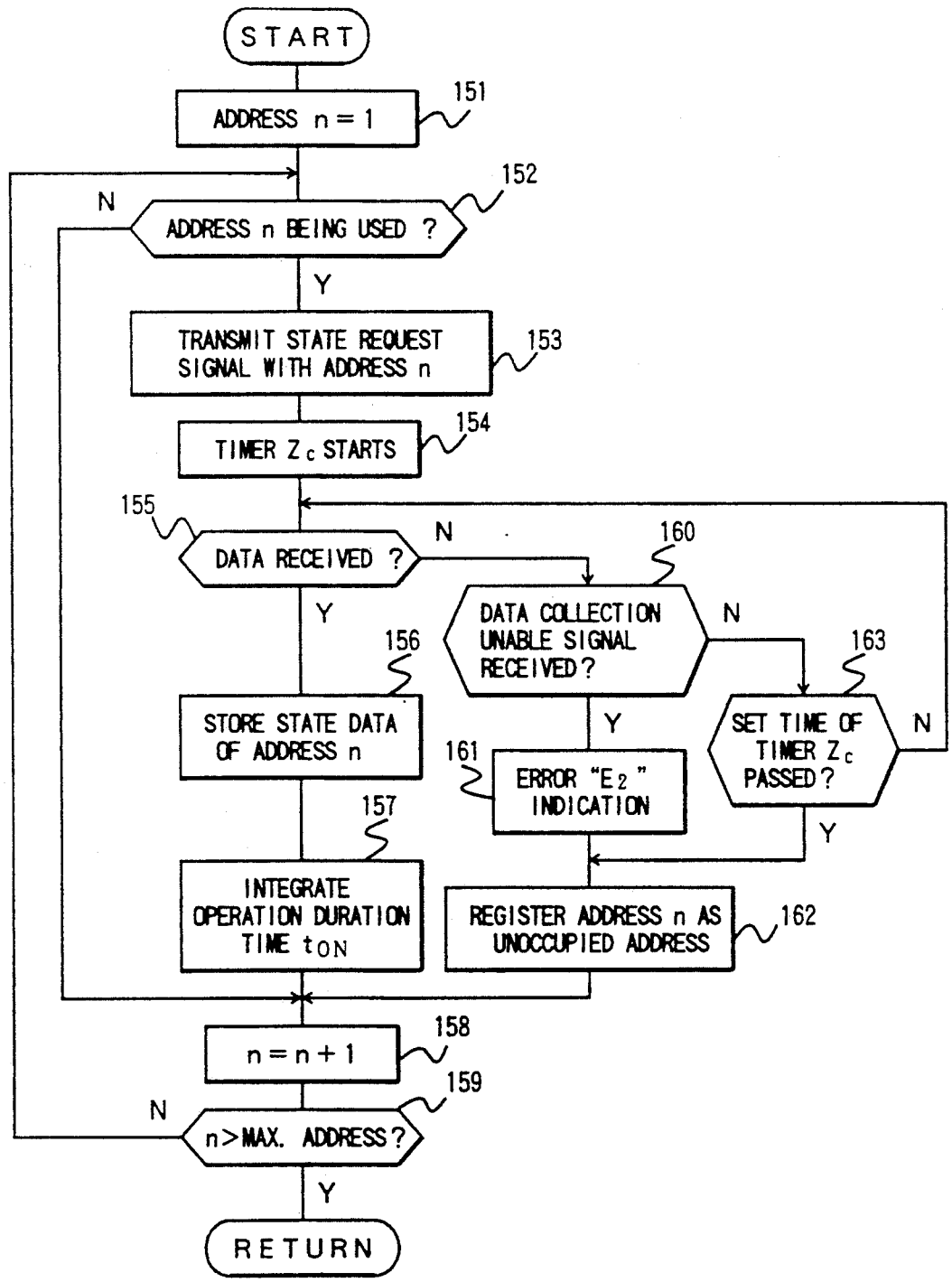
FIG. 14 is a flowchart showing a data correction procedure of the current controller.

FIG. 14 shows a processing procedure in the case where the current controller 20 makes a data output request for the transmitting/receiving adapters 15, 16 and 17 to carry out data collection.

In this case, whether or not a current address is an address already used for address registration in order of an address No. is examined. As a result, if an address is the address already used, that address is added to a present address to transmit a state request signal. At this stage, the current controller 20 starts timer $Z_c$ (steps 151 to 154). Then, if a state signal of a requested address is transmitted, the current controller 20 stores it and integrates the operation duration $t_{ON}$ on the basis of the operating state data. Processing similar to the above is executed in connection with all registered addresses (steps 155 to 159). In the event that data fails to be collected, or the set time of the timer $Z_c$ has passed in the state where data collection cannot be carried out, the current controller 20 registers that address as an empty address to carry out data collection for the next address (steps 160 to 163).

By carrying out data collection in a manner stated above, use state (whether or not an air-conditioner is used), A/C type setting, starting current value $I_{K(n)}$, operating state, present current value $I_{L(n)}$ flowing, limit Current value $I_{LIM(n)}$, presence or absence of human body, and operating time, in connection with the inverter air-conditioners 11 and 12 and the ordinary air-conditioner 13 as shown in the following Table 1, are stored into the memory section of the current controller 20.

TABLE 1

| No. | Use State | A/C Type Setting | Starting Current $I_{K(n)}$ | A/C Operating State | Value of Current Flowing $I_{L(n)}$ | Current Limit Value $I_{LIM(n)}$ | Presence or Absence of Human Body | Operating Hour |
|---|---|---|---|---|---|---|---|---|
| a | Use | INV-A/C | 5 A | ON | 8 A | 8 A | Presence | 0.5 H |
| b | Use | INV-A/C | 7 A | ON | 5 A | 10 A | Presence | 1.0 H |
| c | Use | N-A/C | 10 A | ON | | | Absence | 1.5 H |
| d | Not use | — | — | — | — | — | — | — |

TABLE 1-continued

| No. | Use State | A/C Type Setting | Starting Current $I_{K(n)}$ | A/C Operating State | Value of Current Flowing $I_{L(n)}$ | Current Limit Value $I_{LIM(n)}$ | Presence or Absence of Human Body | Operating Hour |
|---|---|---|---|---|---|---|---|---|
| 1 | Not use | — | — | — | — | — | — | — |

Figure 15:
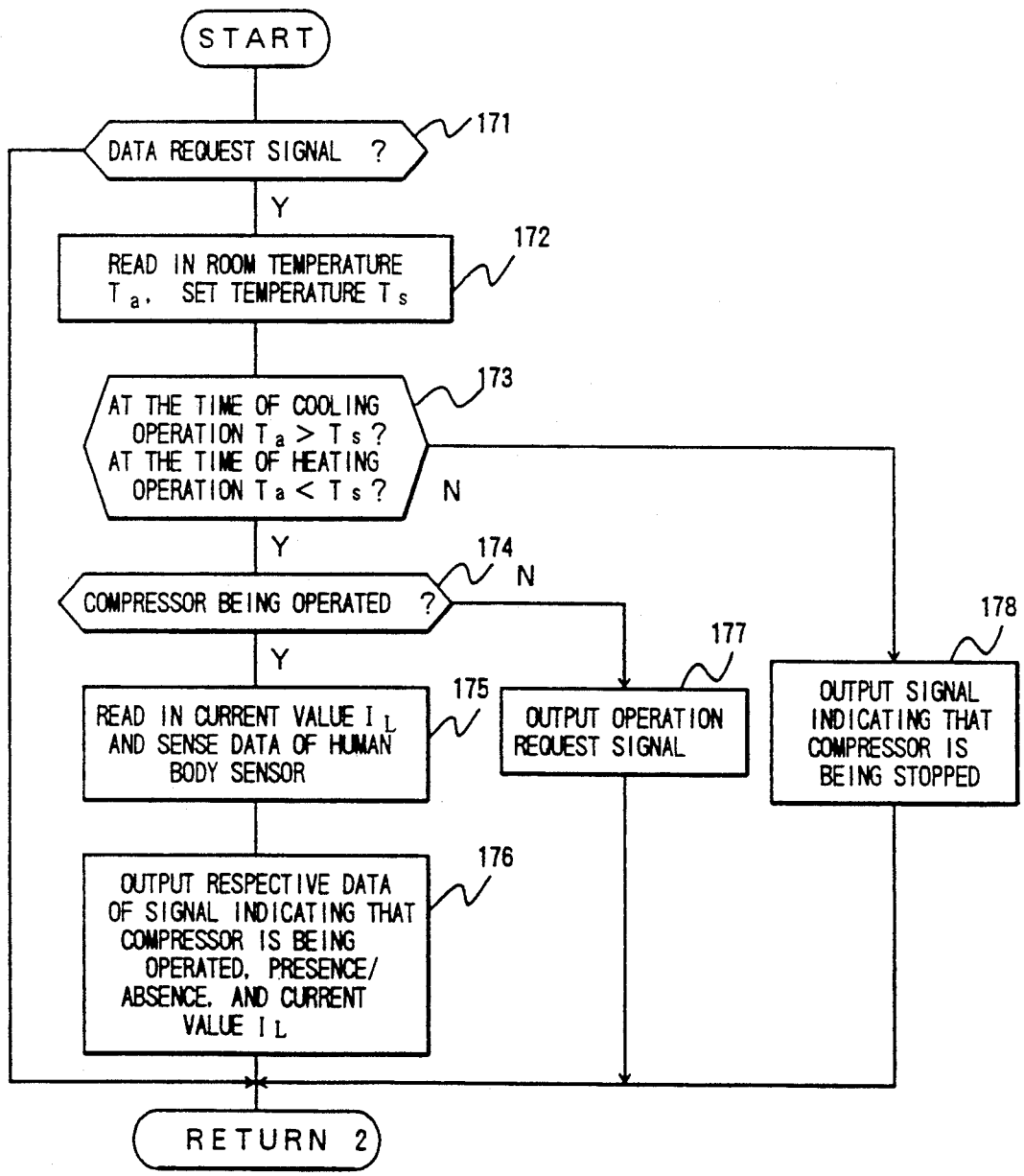
FIG. 15 is a flowchart showing a data transfer procedure of an inverter air-conditioner.

INV-A/C: Inverter Air-conditioner
N-A/C: Ordinary Air-conditioner (c) Data transfer function FIG. 15 shows a data transfer processing procedure carried out by the inverter air-conditioner 11 in the case where a data request is given from the transmitting-/receiving adapter 15. If a data request signal is given, the inverter air-conditioner 11 reads thereinto a room temperature $T_a$ and a set temperature $T_s$ to carry out an operation such that when room temperature $T_a$ is higher than set temperature $T_s$ at the time of heating operation (room temperature $T_a$ is lower than set temperature $T_s$ at the time of heating operation), and the compressor is being operated, the inverter air-conditioner 11 reads thereinto data of a current value $I_L$ at that time and sense data by the human body sensor 41 to transmit these data (steps 171 to 176). If the compressor is in a stopped state in the state where the room temperature $T_a$ is higher than the set temperature $T_s$ at the time of cooling operation (the room temperature $T_a$ is lower than the set temperature $T_s$ at the time of heating operation), an operation request signal is outputted (step 177). On the other hand, when the room temperature $T_a$ is lower than the set temperature $T_s$ at the time of cooling operation (the room temperature $T_a$ is higher than the set temperature $T_s$ at the time of heating operation), a signal indicating that the compressor is in a stopped state is outputted (step 178).

Figure 16:
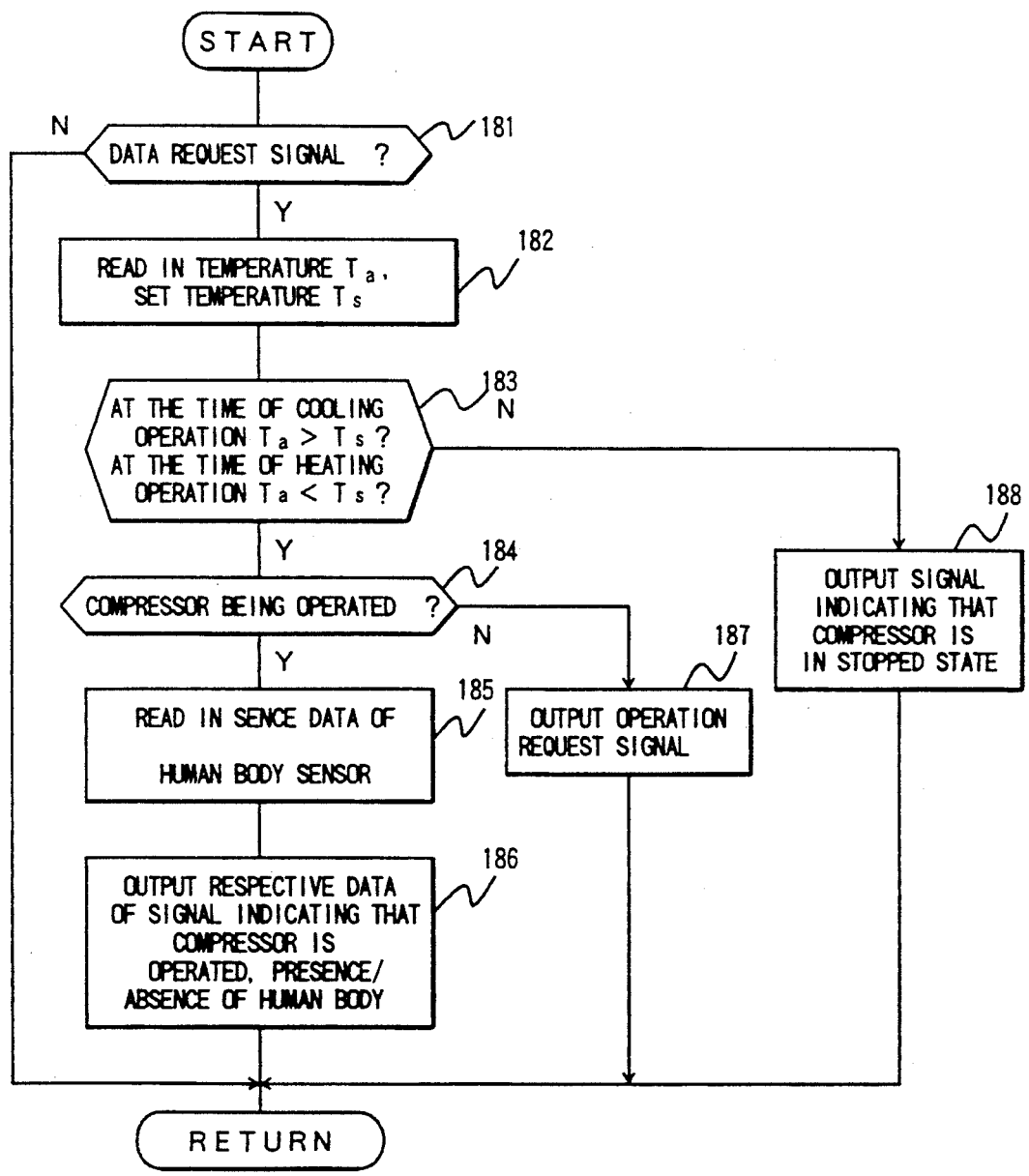
FIG. 16 is a flowchart showing a data transfer procedure of an ordinary air-conditioner.

FIG. 16 shows a data transfer processing procedure carried by the ordinary air-conditioner 13 in the case where a data request is given from the transmitting-/receiving adapter 17. The ordinary air-conditioner 13 reads thereinto a signal indicating that the compressor is being operated and data indicating whether or not there is a human body from the human body sensor 41 to transmit them (steps 181 to 186). If the compressor is in a stopped state in the state where room temperature $T_a$ is higher than set temperature $T_s$ at the time of cooling operation (room temperature $T_a$ is lower than set temperature $T_s$ at the time of heating operation), an operation request signal is outputted (step 187). In contrast, when room temperature $T_a$ is lower than set temperature $T_s$ at the time of cooling operation (room temperature $T_a$ is higher than set temperature $T_s$ at the time of heating operation), a signal indicating that the compressor is in a stopped state is outputted (step 188).

(d) Current limiting function

Figure 17A:
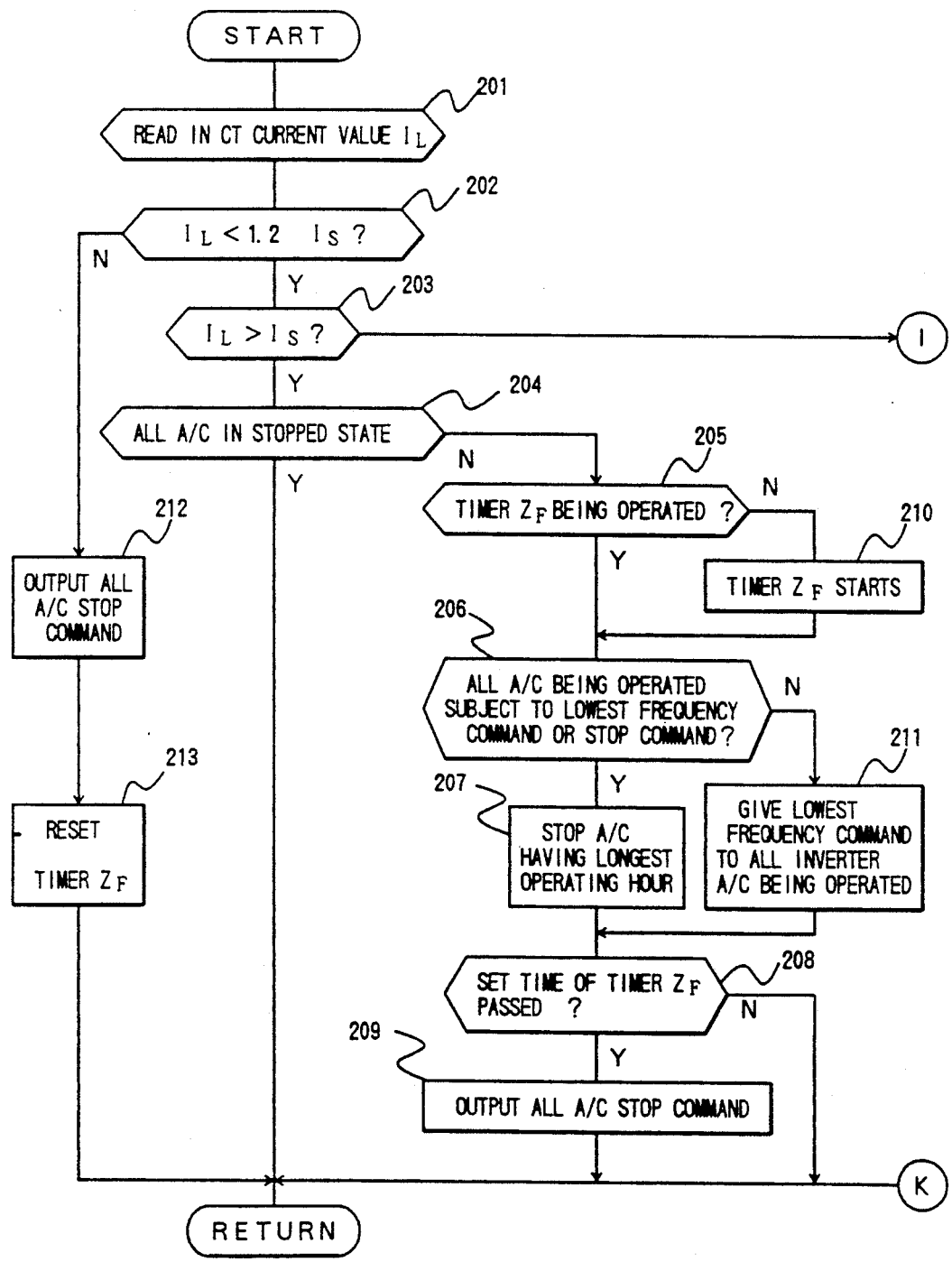
Figure 17B:
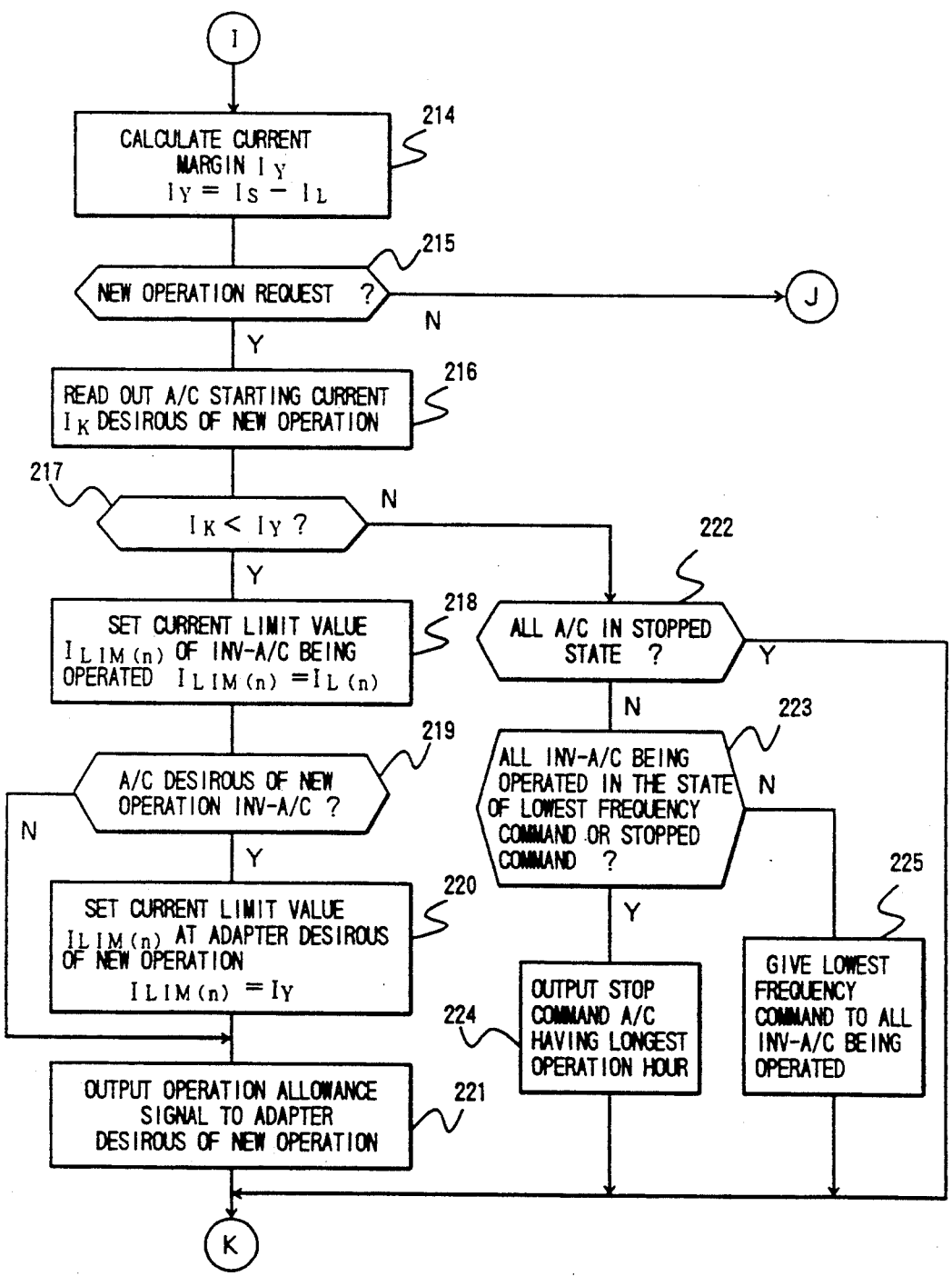

FIGS. 17A, 17B and 17C show a current limiting processing procedure carried out by the current controller 20 in the case where control data are transferred from respective transmitting/receiving adapters 15, 16 and 17.

The current controller 20 first reads thereinto a current value $I_L$ of the large power supply line 5 on the basis of an output of the CT 34 to judge whether or not this current value $I_L$ is smaller than a value which is 1.2 times greater than a current limit value $I_s$ ($=1.2\ I_s$). When the current limit value $I_s$ is smaller than 1.2 $I_s$, judgment is made as to whether or not the current value $I_L$ is larger than the current limit value $I_s$ (steps 201 to 203). If the current value $I_L$ is above the current limit value $I_s$, any measure must be taken. If all air-conditioners are stopped at that stage, the processing procedure shifts to any other control routine for the reason why the fact that the current value $I_L$ is above the current limit value $I_s$ is due to any other cause (step 204). However, if all air-conditioners are not in a stopped state, a timer $Z_F$ for setting an allowance time until the breaker 2 is interrupted is caused to be started, and whether or not there is the state before the set time of the timer $Z_F$ has passed, i.e., air-conditioners are being operated is judged (steps 205, 210). This is the judgment for carrying out any processing before the breaker 2 conducts an interrupting operation. If the timer $Z_F$ is being operated, judgment is made as to whether or not all inverter air-conditioners being operated are subject to an operation command at a lowest frequency, or are subject to a stop command. When there is no room for reducing a current consumption due to lowering of the operating frequency, an air-conditioner of which operation time is the longest is stopped. If all the inverters are not subject to an operation command at the lowest frequency, an operation command at the lowest frequency is outputted to all the inverter air conditioners being operated when all the inverters are not also subject to a stop command (steps 206, 207, 211). When there still lasts the state where the current value $I_L$ is above the current limit value $I_s$ even if such a command is outputted, a stop command is outputted to all the air-conditioners after the set time of the timer $Z_F$ has passed (steps 208, 209). In the case where the current value $I_L$ is first judged to be larger than 1.2 $I_s$, a stop command is immediately outputted to all the air-conditioners. If the timer $Z_F$ is assumed to be in an operative state, it is reset along with an output of the stop command (steps 212, 213). In this case, the reason why all the air-conditioners are caused to be immediately stopped is to prevent that there results circumstances where the breaker 3 may be tripped.

Further, if the current value $I_L$ is assumed to be less than the current limit value $I_s$, such an operation can be made to operate an air-conditioner in a stopped state, or to output a frequency increase command in order to enhance or increase the capability of the inverter air-conditioner. For this purpose, an approach is employed to calculate a difference between a current limit value $I_s$ and a current value $I_L$, i.e., a margin $I_Y=I_s-I$ to examine at this stage whether or not there is a new operation request (steps 214, 215). As a result, if there is any operation request, an air-conditioner desirous of new operation can be operated. Accordingly, at that stage, a current limit value $I_{LIM(n)}$ of an inverter air-conditioner being operated at present is limited to a value less than a current value $I_{L(n)}$ of an inverter air-conditioner being operated at present to judge which air-conditioner is desirous of new operation thereafter to output the margin $I_Y$ as a current limit value $I_{LIM(n)}$ to that air-conditioner to subsequently output an operation allowance signal to a transmitting/receiving adapter for which an operation is newly requested (steps 216 to 221). However, when the margin $I_Y$ is assumed to be smaller than the starting current $I_k$, even if there is a request for a new operation, it is impossible to operate an air-conditioner desirous of a new operation. In view of this, a procedure is employed to judge whether or not all the air-conditioner are stopped to judge, unless they are in a stopped state, whether or not all inverters being operated are subject to an operation command or a stop command. As a result, if they are judged to be subject to an operation command or a stop command, a stop command is outputted to an air-conditioner of which operation time is the longest. Further, in the case where such air-conditioners are not subject to both an operation command at the lowest frequency and a stop command, a lowest frequency operation command is outputted to all the inverter air-conditioners being operated (steps 222 to 225).

On the other hand, if there was no new operation request in the state where there is any margin in current, whether or not the current value I is larger than 0.9 $I_s$ is examined. As a result, if the former is larger than the latter, a present current value $I_{L(n)}$ is outputted as a current limit value $I_{LIM(n)}$ to inverter air-conditioners being operated (steps 226, 227). Further, in the case where the current value I is smaller than 0.9 $I_s$, the number K of inverter air-conditioners, which are being operated, and are detecting human body, is calculated. Subsequently, the number G of inverter air-conditioners, which are being operated, and are not detecting a human body, is calculated (steps 228, 229). Then, margin $I_Y$ of current is divided by (G+2K) in order to implement weighting to inverter air-conditioners being operated at the ratio of 2 to 1 in dependency upon whether or not they are detecting a human body, thus to calculate a current distribution value ΔI (step 230). A value obtained by adding a value (=2ΔI) twice greater than the current distribution value ΔI to a present current value $I_{L(n)}$ is outputted as a current limit value $I_{LIM(n)}$ to the inverter air-conditioners which are detecting a human body. On the other hand, a value obtained by adding a current distribution value ΔI to the present current value $I_{L(n)}$ is outputted as a current limit value $I_{LIM(n)}$ to the inverter air-conditioners which are not detecting a human body (steps 231, 232).

Figure 18A:
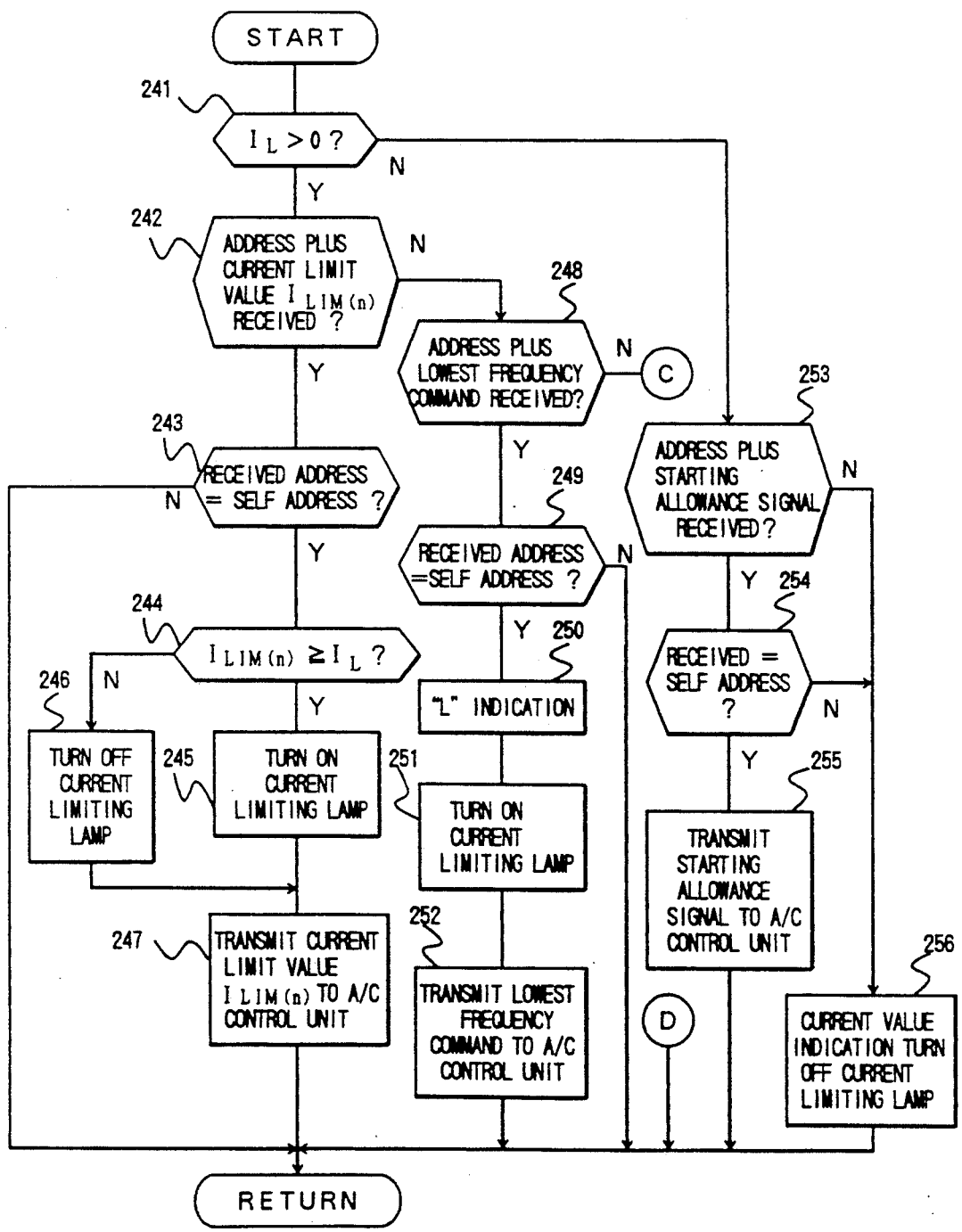
FIGS. 18A and 18B are flowcharts showing a current limiting procedure of the first transmitting/receiving adapter.
Figure 18B:
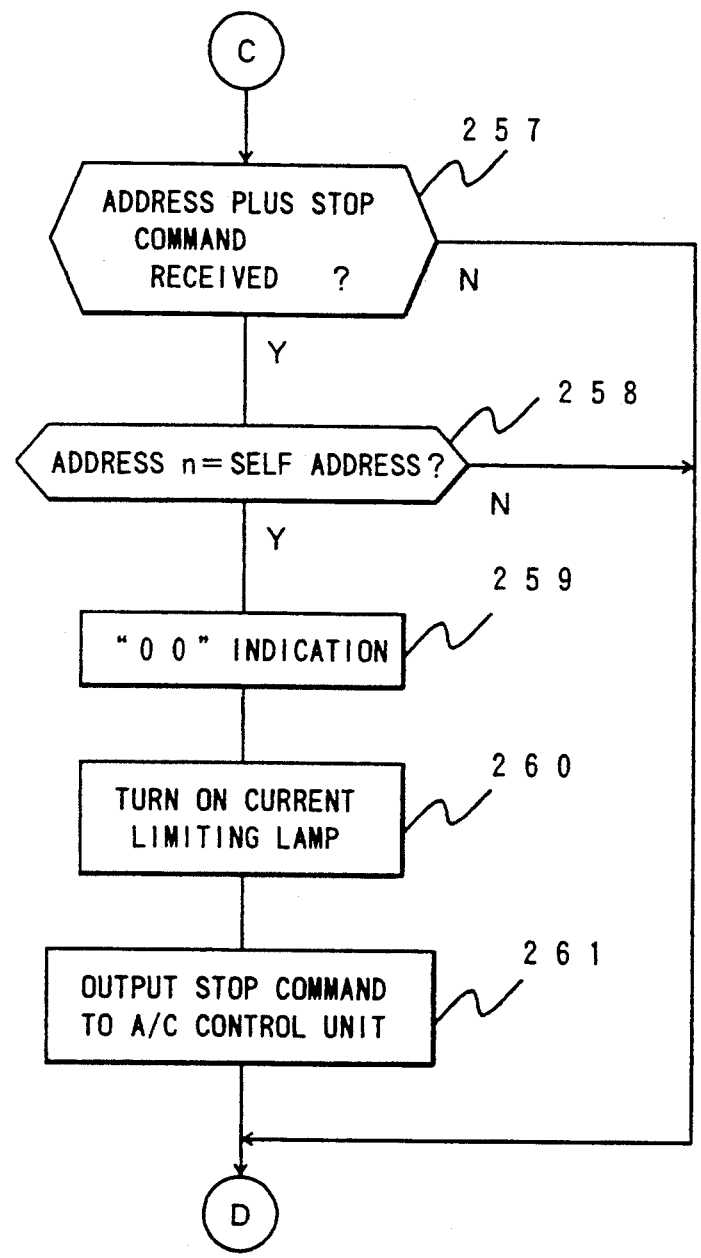

FIGS. 18A and 18B show a current limiting processing procedure of the transmitting/receiving adapter 15 carried out in correspondence with commands that the current controller 20 respectively output in dependency upon the magnitude of a current. In this case, after it is confirmed that a current flows in a corresponding air-conditioner, judgment is made as to whether or not data in which the current limit value $I_{LIM(n)}$ is added to an address is received (steps 241, 242). If these data are received, whether or not a received address is in correspondence with a self-address is examined. As a result, if the former is in correspondence with the latter, comparison between the current limit value $I_{LIM(n)}$ and the present current value $I_L$ is made. As a result, when the relationship expressed as $I_{LIM(n)} \geq I_L$ holds, the current limit indication section 40B is turned ON to transmit the current limit value $I_{LIM(n)}$ to the inverter air-conditioner. In contrast, if the relationship expressed as $I_{LIM(n)} < I_L$ holds, the current limit indication section 40B is turned OFF to transmit the current limit value $I_{LIM(n)}$ to the inverter air-conditioner 11 (steps 243 to 247).

It is to be noted that when data in which the current limit value $I_{LIM(n)}$ is added to an address is not received, judgment is made as to whether or not data in which the lowest frequency operation command is added to an address is received. As a result, if that data is judged to be received, whether or not the received address is in correspondence with the self-address is examined. As a result, if the former is in correspondence with the latter, the indication to the effect that operation is conducted at the lowest frequency is made to allow the current limit indication section 40B to be turned On to output the lowest frequency command to the inverter air-conditioner 11 (steps 248 to 252). Meanwhile, if a current of the inverter air-conditioner 11 is equal to zero, i.e., the inverter air-conditioner 11 is in a stopped state, judgment is made as to whether or not data in which a starting allowance signal is added to an address is received. As a result, if the address is in correspondence with a self-address, the starting allowance signal is delivered to the inverter air-conditioner 11. In contrast, if that address is not in correspondence with the self-address, the limit current value indication section 40A and the current limit indication section 40B are both turned OFF (steps 253 to 256).

It is further to be noted that if a signal in which a lowest frequency command is added to an address is assumed not to be received during operation of the inverter air-conditioner 11, judgment is made as to whether or not a signal in which a stop command is added to an address is received. If that signal is received and the received address is in correspondence with the self-address, the indication to the effect of stop is made by "00", and the current limit indication section 40B is turned OFF to output a stop command to the inverter air conditioner 11 (steps 257 to 261).

Figure 19:
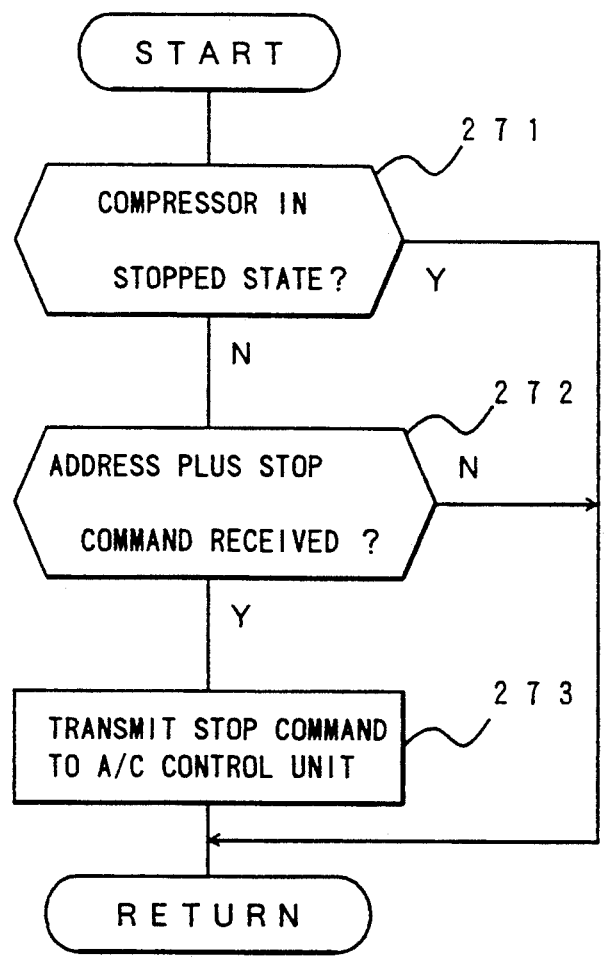
FIG. 19 is a flowchart showing a current limiting procedure of a third transmitting/receiving adapter.

FIG. 19 shows a current limiting processing procedure of the transmitting/receiving adapter 17 corresponding to commands that the current controller 20 respectively outputs in dependency upon the magnitude of a current. Here, judgment is made as to whether or not the compressor is in a stopped state. As a result, if the compressor is not in a stopped state, judgment is made as to whether or not a signal in which a stop command is added is received. As a result, that signal is judged to be received, stop command is transmitted to the ordinary air-conditioner 13 (steps 271 to 273).

Figure 20:
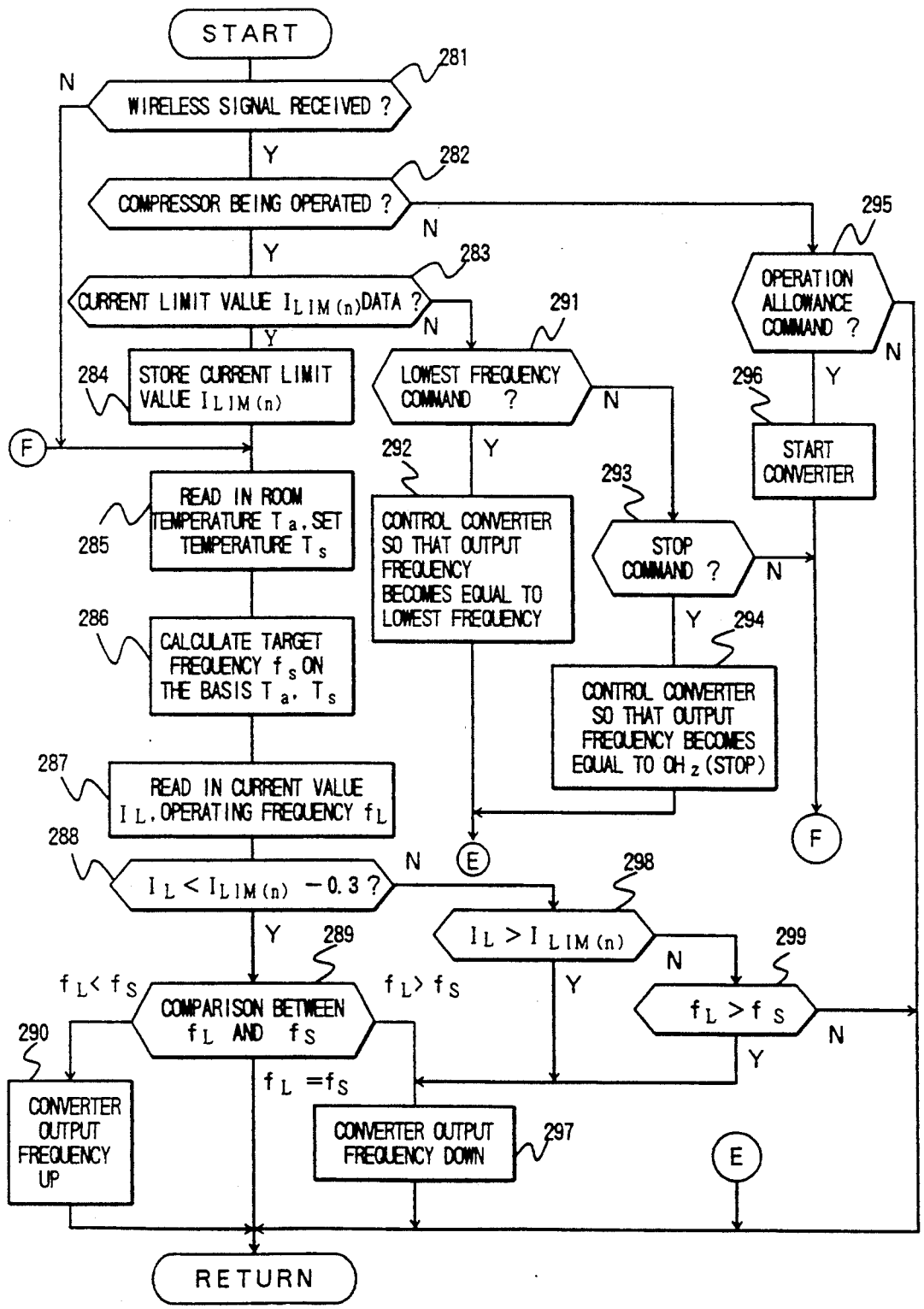
FIG. 20 is a flowchart showing a current limiting procedure of the inverter air-conditioner.

FIG. 20 shows a current limiting processing procedure carried out by the control unit of the inverter air-conditioner 11. Initially, only when a wireless signal is received from the remote controller 70, and the compressor is being operated, judgment is made as to whether or not data of the current limit value $I_{LIM(n)}$ is received. As a result, if that data is judged to be received, it is stored (steps 281 to 284). Subsequently, a room temperature $T_a$ and a set temperature $T_s$ are read in to calculate, on the basis of a difference therebetween, i.e., a temperature deviation $(T_a - T_s)$, a target or objective operation frequency $f_s$ for reducing that difference (steps 285, 286). Further, a present current value $I_L$ and an operation frequency $f_L$ are read in to compare this current value $I_L$ with a value obtained by subtracting 0.3 (value corresponding to hysteresis for stable control) from the current limit value $I_{LIM(n)}$. As a result, when the current value $I_L$ is smaller than the above value, and the present operation frequency $f_L$ is lower than the target frequency $f_s$, the output frequency of the frequency converter 56 is increased (steps 287 to 290).

On the other hand, when data of the current limit value $I_{LIM(n)}$ is not received, judgment is made as to whether or not there is a lowest frequency command. As a result, if it is judged that there is such a command, the output frequency of the frequency converter 56 is controlled so that it becomes equal to the lowest frequency. In contrast, when it is judged that there is no lowest frequency command, judgment is made as to whether or not there is a stop command. As a result, when it is judged that there is such a command, the output frequency of the frequency converter 56 is caused to be equal to 0 Hz to stop the compressor (steps 291 to 294). Further, in the event that the compressor is not operated even if the wireless signal is received, judgment is made as to whether or not there is an operation allowance command. Responding to presence of the operation allowance command, the frequency converter 56 is started (steps 295, 296).

In the state where the present operation frequency $f_L$ is higher than the target operation frequency $f_s$, the output frequency of the frequency converter 56 is lowered (step 297). In addition, comparison between the present current value $I_L$ and a value obtained by subtracting 0.3 from the current limit value $I_{LIM(n)}$ is made. As a result, when the current value $I_L$ is larger than the above value, comparison between the current value $I_L$ and the current limit value $I_{LIM(n)}$ is made. As a result, when the current value $I_L$ is larger than the current limit value $I_{LIM(n)}$, the output frequency of the frequency converter is lowered (steps 298, 299).

Figure 21:
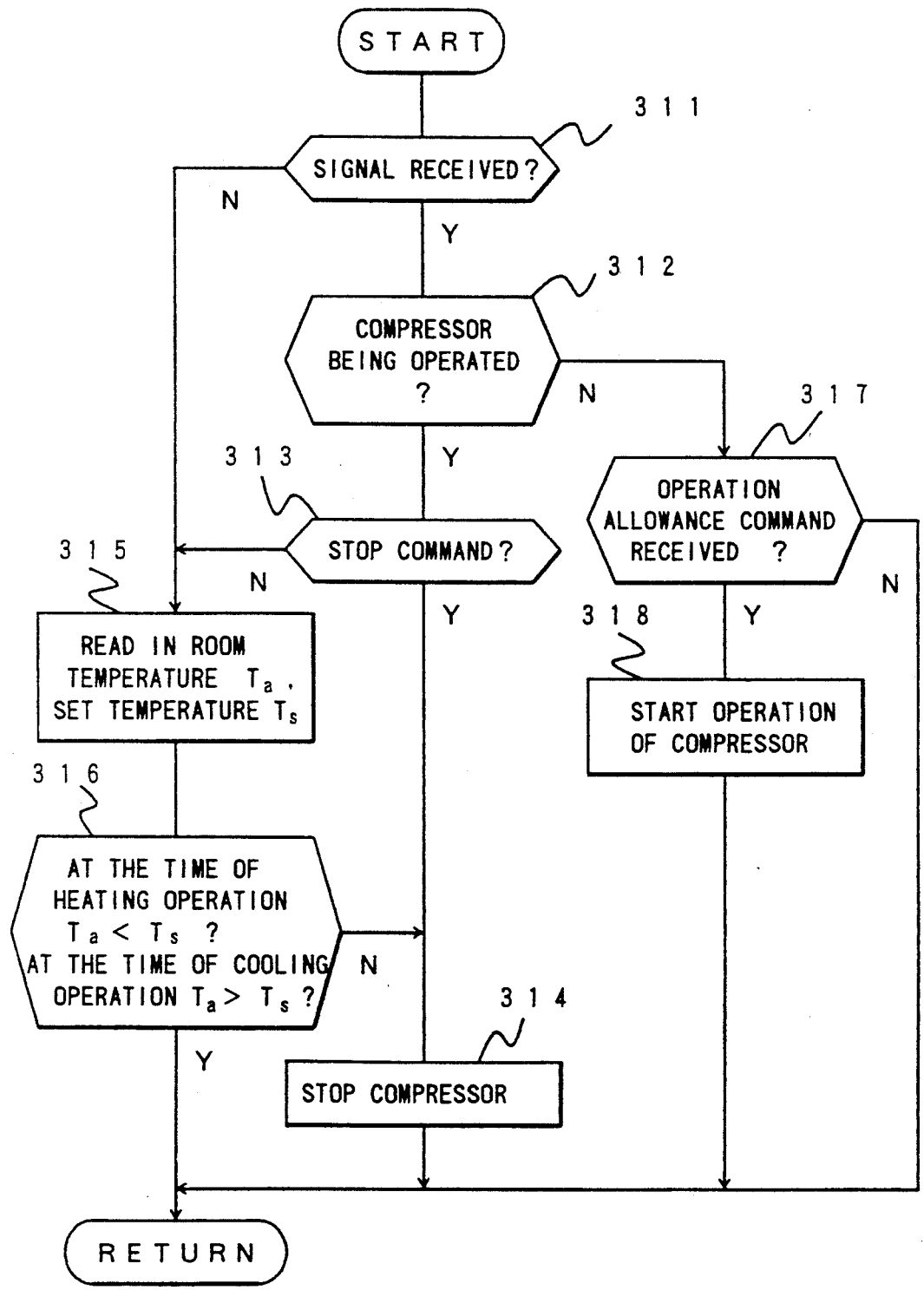
FIG. 21 is a flowchart showing a current limiting procedure of an ordinary air-conditioner.

FIG. 21 shows a current limiting processing procedure carried out by the control unit of the ordinary air-conditioner 13. At this procedure, whether or not a signal is received from the transmitting/receiving adapter 17 is first examined. As a result, if that signal is received, judgment is made as to whether or not the compressor is being operated. If a stop command is received during the operation of the compressor, the compressor is caused to be stopped (steps 311 to 314). On the other hand, in the case where no signal is received from the transmitting/receiving adapter 17, or when no stop command is received, a room temperature $T_a$ and a set temperature $T_s$ are read in. When the room temperature $T_a$ is lower than the set temperature $T_s$ at the time of heating operation (when the room temperature $T_a$ is higher than the set temperature $T_s$ at the time of cooling operation), this routine is completed to shift to any other routine. In contrast, when the room temperature $T_a$ is higher than the set temperature $T_s$ at the time of heating operation (when the room temperature $T_a$ is lower than the set temperature $T_s$ at the time of cooling operation), the compressor is caused to be stopped (steps 315, 316). It is to be noted that if the compressor is assumed to be stopped when a signal is received, the operation of the compressor is started after the operation allowance signal is received (steps 317, 318).

The control contents explained with reference to FIGS. 11 to 21 can be collectively listed as shown in the following Table 2.

TABLE 2

| Current Range | Presence or Absence of new operation request | |
|---|---|---|
| | Presence | Absence |
| $1.2 I_S < I$ | ① Immediately stop all A/C | Same as left |
| $I_S < I < 1.2 I_S$ | ① Operate compressors of INV-A/C being operated at lowest frequency<br>② After compressors are controlled so that its frequency is equal to lowest frequency, they are stopped in succession in order of length of operating hour<br>③ After $T_F$ time continuously has passed, compressors of all A/C | Same as left |
| $0.9 I_S < I < I_S$ | ① In case current margin $I_Y >$ Starting current $I_K$,<br>1) Limit current values of INV-A/C being operated to actual operating current value $I_{LIM(n)} = I_{L(n)}$<br>2) Start A/C making request for new operation<br>② In case current margin $I_Y <$ Starting current $I_K$,<br>1) Operate compressors of INV-A/C being operated at lowest frequency<br>2) After limited to lowest frequency, compressors are stopped in succession in order of length of operating hour | ① Limit current values of INV-A/C being operated to actual current value<br>$I_{LIM(n)} = I_{L(n)}$ |
| $I < 0.9 I_S$ | Same as above | Distribution of current margin<br>1) Current distribution to INV-A/C detecting human body . . . Give instruction of current limit value $I_{LIM(n)}$<br>$I_{LIM(n)} = 2(I_S - I)/(2K + G) + I_{L(n)}$<br>2) Current distribution to INV-A/C not detecting human body . . . Give instruction of current limit value $I_{LIM(n)}$<br>$I_{LIM(n)} = (I_S - I)/(2K + G) + I_{L(n)}$ |

Figure 22:
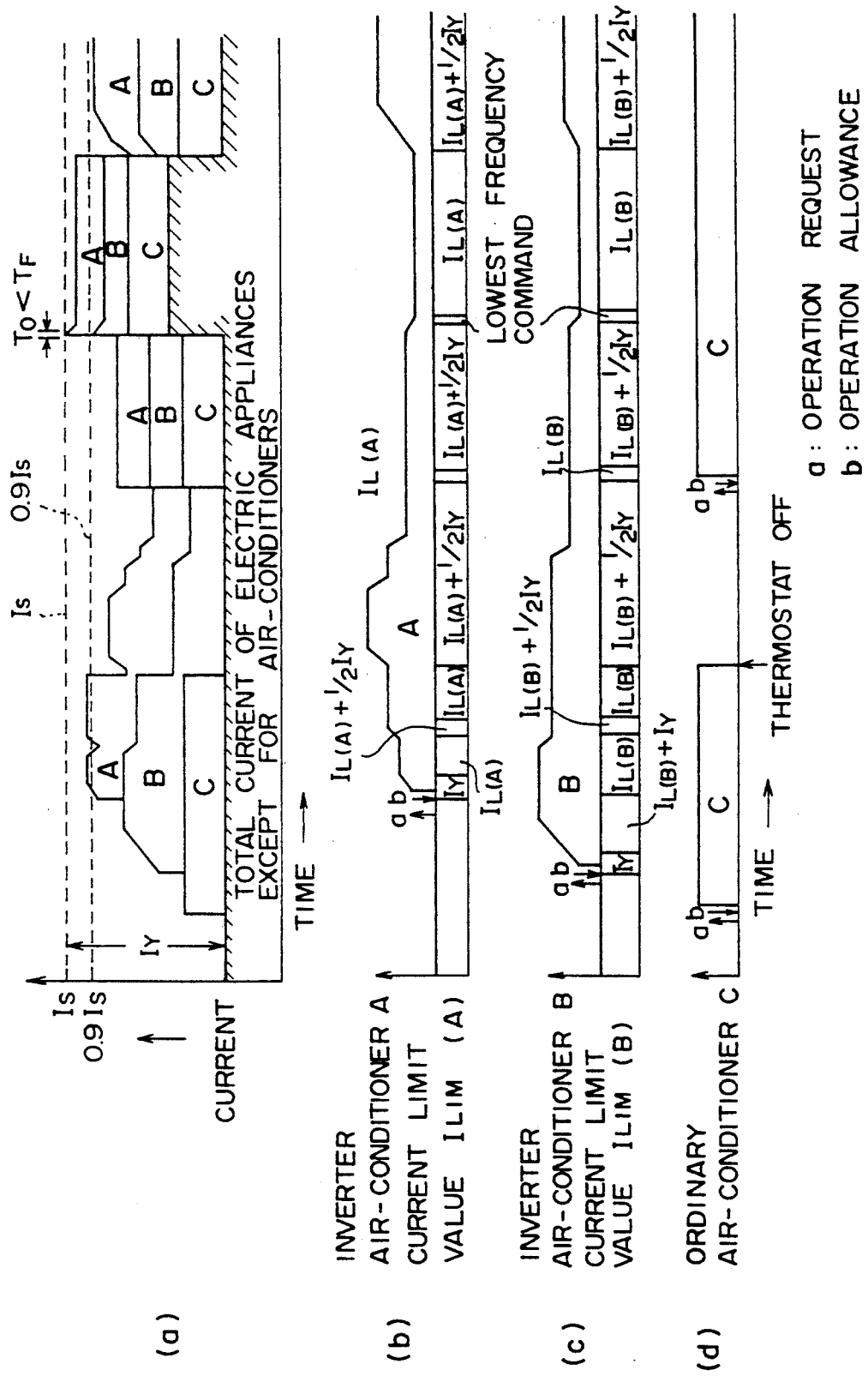
FIG. 22 is a time chart showing changes in time of a current for the purpose of explaining the operation of the entirety of the apparatus according to this invention.
Figure 23:
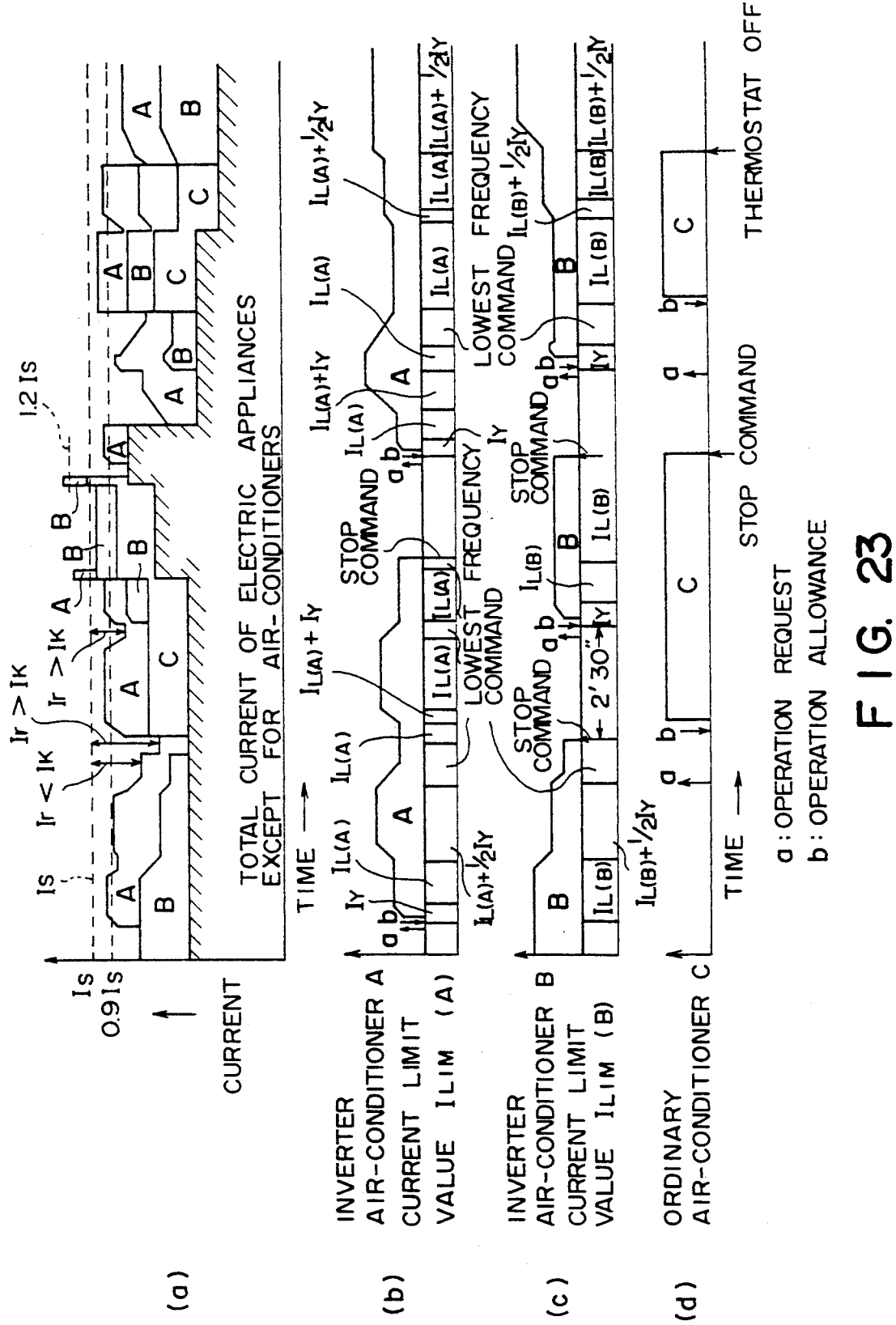
FIG. 23 is a time chart similar to that of FIG. 22 for the purpose of explaining the operation of the entirety of the apparatus according to this invention.

An overall or total current of the power supply lines, the current change state of the inverter air-conditioners 11 and 12 and the ordinary air-conditioner 13, and the change state of the current limit value $I_{LIM(n)}$ are illustrated in connection with two cases in FIGS. 22 and 23. Here, an indication is made such that the inverter air-conditioner 11 is represented by A, the inverter air-conditioner 12 is represented by B, the ordinary air-conditioner 13 is represented by C, an operation request for the current controller 20 is represented by a, and an operation allowance from the current controller 20 is represented by b. Further, in comparison between the room temperature $T_a$ and the set temperature $T_s$, the operation of the ordinary air-conditioner C is stopped at the time of heating operation when the relationship expressed as $T_a > T_s$ holds, and the operation of the ordinary air-conditioner C is stopped at the time of cooling operation when the relationship expressed as $T_a < T_s$ holds. In the figures, an indication is made such that the thermostat is turned OFF.

While this invention has been described in accordance with the preferred embodiment, the current set value for stopping the operation of the air-conditioner, or lowering the drive frequency of the compressor in the current controller 20 must be set to a value lower than the trip current value of the breaker 3.

By carrying out such a setting, in the case where the current controller 20 is connected to a breaker set to a correct value, although there is a considerable margin in current, the operation of an electric load in a centralized control is stopped, or the drive frequency of the compressor is lowered, giving rise to the problem that the operation of an electric load may not be carried out when needed, or the capability may become insufficient.

Figure 24:
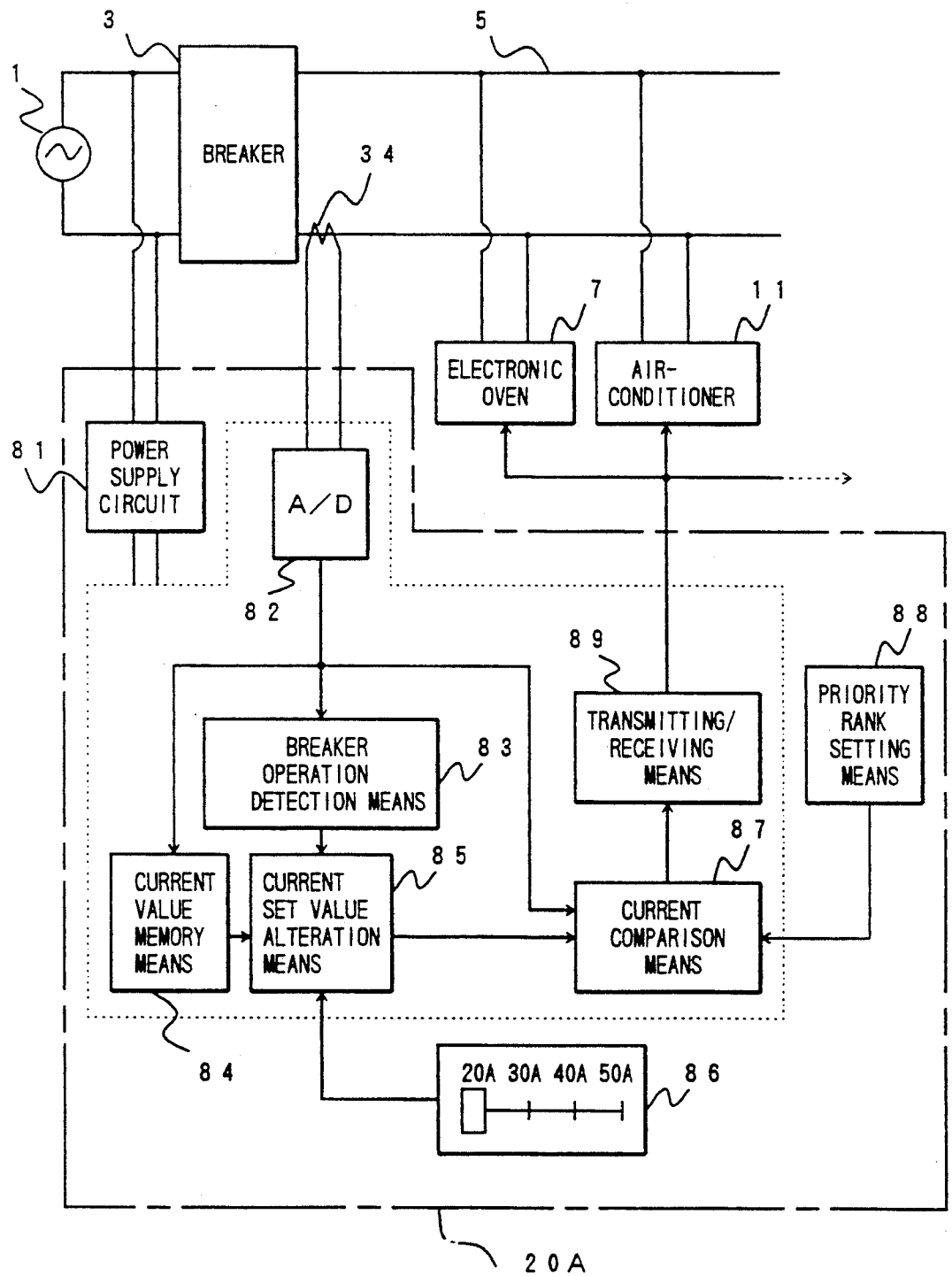
FIG. 24 is a block diagram showing the configuration of another embodiment according to this invention.

FIG. 24 shows another embodiment of the configuration of the current controller proposed in order to solve the above problem. In this figure, a current controller 20A obtains an operating power from an a.c. power supply 1 to carry out ON/OFF control of electric appliances connected to large power supply line 5 such as electric oven 7, and inverter air-conditioner 11, etc. on the basis of an output signal of CT 34. This current controller 20A is constituted so as to include CPU therein. This CPU has functions of respective blocks encompassed by broken lines. The current controller 20A comprises a power supply circuit 81, an A/D converter 82, breaker operation detection means 83, current value memory means 84, current set value alteration means 85, a current capacitor setter 86, current comparison means 87, priority rank setting means 88, and transmitting/receiving means 89.

The power supply circuit 81 is connected to the power supply side of the breaker 3. Accordingly, even if the breaker 3 is brought into an OFF state, the current controller 20A can be operated. The A/D converter 82 converts an analog signal from the CT 34 to a digital signal to apply it to the breaker operation detection means 83, the current value memory means 84, and the current comparison means 87. The breaker operation detection means 83 judges that the breaker is subjected to interruptive operation when a current signal from the A/D converter 82 indicates substantially zero amperes (A). Further, when a current to the current controller 20A is interrupted as in the case of service interruption, even if an output of the A/D converter 82 indicates zero amperes (A), because no current is delivered to the current controller 20A, the breaker operation detection means 83 does not carry out any operation.

Such a judgment of the interrupted state of the breaker 3 may be made on the basis of the fact that an output of the A/D converter 82 indicates zero amperes (A) although a voltage is detected on the power supply side of the breaker 3 in place of adopting a method of connecting the power supply circuit 81 to the power supply side of the breaker 3. In this instance, the current controller 20A may employ a system driven by a battery charged by the a.c. power supply 1.

The current capacity setter 86 has four setting positions. Current capacities at respective setting positions are 20A, 30A, 40A and 50A in correspondence with current capacities of power supplies. A set value Io by the current capacity setter 86 is used as a set initial value $I_s$ of the current controller 20A. The current set value alteration means 85 outputs a current value set by the current capacity setter 86 until the breaker 3 is operated, which is judged by the fact that a current I is equal to zero, to read out, after the breaker 3 is operated, a current value I of the large power supply line 5 immediately before the breaker 3 is operated, which is stored in the current value memory means 84, thus to output it as a current limit value. Thereafter, unless the current capacity setter 86 is altered to any other set position, or the breaker 3 is operated for a second time, the current set value alteration means 85 uses that value. Namely, in the case where when the current value memory means 84 is altered to any other position, the breaker 3 is operated for a second time with a current set value at a new set position being as a current limit value, a current value I immediately before the breaker 3 is operated, which is stored in the current value memory means 84, is outputted as a current limit value for a second time.

The current comparison means 87 makes a comparison between a current limit value outputted from the current set value alteration means 85 and a current detection value from the A/D converter 82. As a result, when the latter is larger than the former, an operation is conducted to stop operations of equipments in reverse order of the priority rank set by the priority rank setting means 88, or to lower the operating frequency of the compressor.

As seen from the above result, even in the case where a breaker limited to a low value by unevenness of a limit current of the breaker 3 is used, an approach is employed to detect a limit current value of a breaker actually installed by the interruptive operation of a breaker being used to newly set the limit value of the current controller 20A by using this limit current value as reference, thereby making it possible to securely and automatically set a limit value of the centralized control system to a limit current value of the breaker. Accordingly, there is no possibility that the breaker may be brought into an interruptive state in use at times subsequent thereto. Thus, a breaker installed is permitted to carry out a current limiting operation up to the full range of a limit current value of that breaker.

It is to be noted that the most preferable setting method in this embodiment is a method of installing a current controller 20A thereafter to temporarily increase a total current by using a provisional load such as a heater, etc. to forcedly interrupt the breaker. Thus, the limit value of the current controller 20A can be determined so that it becomes equal to a value set by using a limit current of the breaker as reference. As a result, in use at times subsequent thereto, the current controller 20A will be operated before the breaker carries out an interruptive operation. Thus, the interruptive operation of the breaker can be prevented in advance.

It is to be noted that while, in this embodiment, a limit value of the current controller 20A is set by using, as reference, an actual current value immediately before the breaker carries out an interruptive operation, an approach may be employed to lower the limit value of the current controller 20A by a predetermined value every time the breaker carries out an interruptive operation without using an actual current value immediately before the breaker carries out an interruptive operation. By employing such an approach, the interruptive operation of the breaker is repeated. Eventually, a value slightly lower than the limit current of the breaker will be set as a limit value of the current controller. Thus, results similar to the above can be provided. In the case where this method is adopted, interruption of the breaker may be carried out several times until a limit value of the current controller is finally set. While, in respect of this, this embodiment is slightly inferior in performance to the above-described embodiment, this embodiment advantageously permits the current value memory means to be unnecessary.

What is claimed is:

1. A current control apparatus for an air-conditioning system in which a plurality of large capacity electric loads including at least two air-conditioners of the capability adjustable type are connected to a first power supply line, currents flowing in the air-conditioners being held down to individual current limit values, respectively, an overall or total current of a plurality of electric loads being held down to a value less than a predetermined overall or total current limit value, said current control apparatus comprising:
a first controller adapted for comparing a detected value of said overall current with said overall current limit value to calculate, when the former is smaller than the latter, a distribution value for distributing, to an air-conditioner being operated, a current margin taken as a difference between the detected value of said overall current and said overall current limit value; and second controllers provided for every respective air-conditioners, and adapted to control a current flowing in a corresponding air-conditioner so that it is not above individual current limit value, and to carry out incremental correction of the individual current limit value in accordance with a distribution value calculated by said first controller.

2. An apparatus as set forth in claim 1, wherein said first controller comprises a current control unit for calculating a distribution value of a current, and a carrier unit for carrying out a carrier communication between said carrier unit and said second controllers, and wherein each of said second controllers comprises an individual control unit for controlling a current of a corresponding air-conditioner so as not to exceed said individual current limit value, and a transmitting/receiving unit for carrying out carrier communication between said transmitting/receiving unit and said carrier unit of said first controller.

3. An apparatus as set forth in claim 2, wherein said system has a second power supply line to which a small capacity electric load is connected, said transmitting/receiving unit of each of said second controllers being adapted to receive an operating power from said second power supply line to become operative, and being adapted to mutually carry out carrier communication through said second power supply line between said transmitting/receiving unit of each of said second controllers and said carrier unit of said first controller.

4. An apparatus as set forth in claim 3, wherein said current control unit of said first controller is adapted to receive an operating power from a distribution line common to both said first and second power supply lines to become operative.

5. An apparatus as set forth in claim 1, wherein each of said second controllers comprises a human body sensor for detecting whether or not there is a human body in a corresponding room, and wherein said first controller is operative to calculate said distribution value with respect to an air-conditioner for a room where said human body sensor has sensed existence of a human body with said distribution value being caused to have a weight greater than that with respect to an air-conditioner for a room where existence of a human body is not sensed.

6. An apparatus as set forth in claim 1, wherein said first controller includes:

comparison means for comparing said current margin with a starting current of a new air-conditioner which newly makes a request for starting of operation, and means such that when said current margin is greater than said starting current as the result of comparison by said comparison means, said means is operative to give an operation allowance to said new air-conditioner which newly makes a request for starting of operation.

7. An apparatus as set forth in claim 1, wherein said first controller includes:

means such that whenever said operation allowance is given to said air-conditioner which makes a request for starting of operation, said means is operative to set respective values of currents flowing in air-conditioners being operated at that time point as a new individual current limit value of a corresponding air-conditioner, and means for setting said current margin as an individual current limit value with respect to said new air-conditioner which newly makes a request for starting of operation.

8. An apparatus as set forth in claim 1, wherein said first controller includes:

comparison means for comparing said current margin with a starting current of an air-conditioner which makes a request for starting of operation, and means such that when said current margin is smaller than said starting current as the result of comparison by said comparison means, said means gives a lowest operating frequency command to said air-compressors being operated.

9. An apparatus as set forth in claim 2, wherein said air-conditioner carries out communication with said carrier unit by using infrared ray means.

* * * * *